US011586320B2

(12) United States Patent
Rahman et al.

(10) Patent No.: US 11,586,320 B2
(45) Date of Patent: *Feb. 21, 2023

(54) HANDWRITTEN DATA CAPTURE METHOD AND HANDWRITTEN DATA CAPTURE DEVICE

(71) Applicant: Wacom Co., Ltd., Saitama (JP)

(72) Inventors: Novi Rahman, Düsseldorf (DE); Lachezar Sachov Dodov, Sofia (BG); Tanya Dimitrova, Sofia (BG); Katya Yurukova, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,782

(22) Filed: Oct. 28, 2021

(65) Prior Publication Data

US 2022/0050570 A1 Feb. 17, 2022

Related U.S. Application Data

(63) Continuation of application No. 16/913,712, filed on Jun. 26, 2020, now Pat. No. 11,175,771, which is a (Continued)

(51) Int. Cl.
*G06F 40/00* (2020.01)
*G06F 3/041* (2006.01)
(Continued)

(52) U.S. Cl.
CPC ........ *G06F 3/04162* (2019.05); *G06F 3/0483* (2013.01); *G06F 3/04847* (2013.01);
(Continued)

(58) Field of Classification Search
CPC .. G06F 17/217; G06F 17/242; G06F 3/04847; G06F 40/114; G06F 40/171; G06F 3/04855; G06F 3/04883; G06F 3/0483
See application file for complete search history.

(56) References Cited

U.S. PATENT DOCUMENTS 6,055,552 A 4/2000 Curry
6,473,104 B1 10/2002 Harris
(Continued)

FOREIGN PATENT DOCUMENTS

JP 2001-147771 A 5/2001
JP 2001-522081 A 11/2001
(Continued)

OTHER PUBLICATIONS

Japanese Notice of Reasons for Refusal dated Jul. 21, 2020, for the corresponding Japanese Patent Application No. 2019-206050, 8 pages. (With English Translation).
(Continued)

*Primary Examiner* — Scott T Baderman
*Assistant Examiner* — Barbara M Level
(74) *Attorney, Agent, or Firm* — Seed IP Law Group LLP

(57) ABSTRACT

A handwritten data capture method creates handwritten data including a plurality of pieces of stroke data that is based on writing performed on each page of a paper medium having a plurality of pages. The handwritten data capture method includes: acquiring the plurality of pieces of stroke data created based on the writing sequenced in a writing order; displaying the pieces of stroke data together on a display device; accepting an input of a break position of the pieces of stroke data; identifying a continuous portion of the pieces of stroke data based on the break position and the writing order; updating the display device to display the identified continuous portion of the pieces of stroke data in the writing order; and repeating the accepting, the identifying, and the updating until a given operation is received.

18 Claims, 14 Drawing Sheets

Related U.S. Application Data continuation of application No. 15/879,142, filed on Jan. 24, 2018, now Pat. No. 10,769,349, which is a continuation of application No. PCT/JP2015/072138, filed on Aug. 4, 2015.

(51) Int. Cl.

| | |
|---|---|
| *G06F 3/04855* | (2022.01) |
| *G06F 40/114* | (2020.01) |
| *G06F 40/171* | (2020.01) |
| *G06F 3/0483* | (2013.01) |
| *G06F 3/04847* | (2022.01) |
| *G06F 3/04883* | (2022.01) |

(52) U.S. Cl.
CPC ...... *G06F 3/04855* (2013.01); *G06F 3/04883* (2013.01); *G06F 40/114* (2020.01); *G06F 40/171* (2020.01)

(56) References Cited

U.S. PATENT DOCUMENTS

| | | | |
|---|---|---|---|
| 6,600,834 B1 * | 7/2003 | Su | G06V 30/1423 |
| | | | 382/187 |
| 7,945,855 B2 | 5/2011 | Altman et al. | |
| 8,407,589 B2 * | 3/2013 | Ye | G06V 30/333 |
| | | | 715/263 |
| 9,881,224 B2 * | 1/2018 | Kienzle | G06V 30/1423 |
| 10,769,349 B2 * | 9/2020 | Rahman | G06F 3/04162 |
| 11,175,771 B2 * | 11/2021 | Rahman | G06F 40/171 |
| 2002/0057836 A1 | 5/2002 | Lui et al. | |
| 2004/0234130 A1 | 11/2004 | Lui et al. | |
| 2006/0031764 A1 | 2/2006 | Keyser et al. | |
| 2009/0087095 A1 | 4/2009 | Webb | |
| 2009/0128520 A1 | 5/2009 | Combe | |
| 2011/0157063 A1 | 6/2011 | Yamamoto et al. | |
| 2012/0311438 A1 | 12/2012 | Cranfill et al. | |
| 2013/0033460 A1 | 2/2013 | Silverbrook | |
| 2013/0300675 A1 | 11/2013 | Tsutsui et al. | |
| 2014/0091941 A1 | 4/2014 | Johnson et al. | |
| 2014/0380153 A1 | 12/2014 | Chiu et al. | |
| 2014/0380225 A1 | 12/2014 | Fujiwara | |
| 2015/0193141 A1 | 7/2015 | Goldsmith et al. | |
| 2015/0199059 A1 | 7/2015 | Ota et al. | |
| 2016/0307344 A1 | 10/2016 | Monnier et al. | |

FOREIGN PATENT DOCUMENTS

| | | |
|---|---|---|
| JP | 2001-344063 A | 12/2001 |
| JP | 2003-22257 A | 1/2003 |
| JP | 2007-206845 A | 8/2007 |
| JP | 2008-40860 A | 2/2008 |
| JP | 2013-50827 A | 3/2013 |
| JP | 2013-214192 A | 10/2013 |
| JP | 2013-238917 A | 11/2013 |
| JP | 2015-135544 A | 7/2015 |
| JP | 2015-197766 A | 11/2015 |
| JP | 2016-81218 A | 5/2016 |
| WO | 2016/024329 A1 | 2/2016 |

OTHER PUBLICATIONS

Notification of Reasons for Refusal, dated Apr. 2, 2019, for Japanese Application No. 2016-174608, 13 pages (with machine generated English translation).

* cited by examiner

HANDWRITTEN DATA CAPTURE METHOD AND HANDWRITTEN DATA CAPTURE DEVICE

BACKGROUND

Technical Field

The present disclosure relates to a handwritten data capture method and a handwritten data capture device and, relates, in particular, to a handwritten data capture method and a handwritten data capture device for electronically capturing handwriting written on paper as handwritten data and displaying the handwritten data on a screen.

Description of Related Art

A handwritten data capture device is known that permits electronic capture of handwriting as handwritten data at the time of writing of a letter or drawing of a picture on a paper medium such as report sheet. This kind of device is generally configured to include a position detector such as digitizer and an electronic pen that has a function as a pointing body and a function as a ballpoint pen. A paper medium is placed on a touch surface of the digitizer. According to this configuration, it is possible for the position detector to acquire a series of coordinate data representing the path of motion traced by the electronic pen on the touch surface when a user write some letters or pictures on the surface of the paper medium with using the ballpoint pen function of the electronic pen. The series of coordinate data thus acquired serves as handwritten data that represents handwriting traced by the electronic pen. Japanese Patent Laid-Open No. 2001-147771 discloses an example of such a handwritten data capture device.

Japanese Patent Laid-Open No. 2007-206845 and Japanese Patent Laid-Open No. 2003-022257 disclose examples of handwritten data capture devices using electronic paper that includes an ultrathin display rather than traditional paper made from plant fiber as a paper medium. In these examples, electronic paper and a position detector are overlaid one on top of the other, and the user writes on the electronic paper with an electronic pen. The electronic paper has no position detection function, and handwriting is detected by the position detector. The position detector is configured to display the detected handwriting on the electronic paper. Therefore, the user can have an experience as if he or she wrote on the electronic paper.

Incidentally, as described in Japanese Patent Laid-Open No. 2001-147771 and Japanese Patent Laid-Open No. 2007-206845, there are cases in which a paper medium (traditional paper or electronic paper) including a plurality of pages is used for a handwritten data capture device. In this case, it is necessary for the handwritten data capture device to create handwritten data separately for each page. Otherwise, handwritings written on each of the plurality of pages in the paper medium overlap within one page on the screen.

In Japanese Patent Laid-Open No. 2001-147771 and Japanese Patent Laid-Open No. 2007-206845, creation of page-by-page handwritten data is realized by providing a handwritten data capture device with a function to identify the page being written. Describing specifically, first, in the example of Japanese Patent Laid-Open No. 2001-147771, a barcode indicating a document title and a page number is printed in advance on each page of a paper medium, and the handwritten data capture device is configured to identify the page being written by the user by reading this barcode. In the example of Japanese Patent Laid-Open No. 2007-206845, an integral circuit (IC) chip storing a unique identification (ID) code is embedded in each page of electronic paper, and the handwritten data capture device is configured to identify the page being written by the user by reading this ID code.

According to the technologies of Japanese Patent Laid-Open No. 2001-147771 and Japanese Patent Laid-Open No. 2007-206845, however, barcodes must be printed or IC chips must be embedded in advance in paper media, requiring use of dedicated paper media. Where only dedicated paper media can be used, the handwritten data capture devices lack appeal as products, hampering widespread use. It is desired that page-by-page handwritten data can be created by retroactively inserting a page break at an arbitrary position despite using a general-purpose paper medium.

Also, the handwritten data capture device of Japanese Patent Laid-Open No. 2001-147771 has a turn-over detection function. Using this function allows for detection of the change in page being written, making it possible to create page-by-page handwritten data.

As disclosed in Japanese Patent Laid-Open No. 2001-147771, however, it is necessary to implement hardware for that purpose in the handwritten data capture device so as to realize the turn-over detection function. Implementation of such hardware will contribute to increased price of the handwritten data capture device and at the same time become a cause of failure. Therefore, it is required to be able to create page-by-page handwritten data by means of not only hardware of the handwritten data capture device but also software-based retroactive processing.

BRIEF SUMMARY

Therefore, it is an object of the present disclosure to provide a handwritten data capture method and a handwritten data capture device that, after acquiring handwriting written on general-purpose paper medium including a plurality of pages, can further properly classify that handwritten data representing handwriting as page-by-page handwritten data.

Also, even if a page break can be retroactively specified by the user in order to achieve the above object, it is not easy for the user to specify a page break in data that already has handwritten data overlaid on other data at the same location due to wrong operation.

Even if a coordinate input operation history is retained, coordinate data input at the time of taking notes about an input operation and sketching a picture amounts to an extremely large volume. Searching for proper break positions from among this large number of data is highly burdensome for the user. Also, if a process of updating displayed data is carried out each time the input coordinate position is moved back to a previous point in the time axis, the processing capability of the handwritten data capture device will be suppressed.

Therefore, it is an object of the present disclosure to provide a handwritten data capture method and a handwritten data capture device that can properly classify handwritten data page by page without putting a significant burden on a user and by using a process with only a small burden on the handwritten data capture device.

A handwritten data capture method according to a first aspect of the present disclosure is a handwritten data capture method that creates handwritten data including a plurality of pieces of stroke data based on writing performed on each page of a paper medium having a plurality of pages. The handwritten data capture method includes acquiring the plurality of pieces of stroke data created based on the writing sequenced in a writing order; displaying the pieces of stroke data together on a display device; accepting an input of a break position of the pieces of stroke data; identifying a continuous portion of the pieces of stroke data based on the break position and the writing order; updating the display device to display the identified continuous portion of the pieces of stroke data in the writing order; and repeating the accepting, the identifying, and the updating until a given operation is received.

Also, a handwritten data capture method according to a second aspect of the present disclosure is the above handwritten data capture method according to the first aspect in which the accepting of the input of the break position includes displaying a first user interface on the display device. The first user interface accepts the first user interface accepts the input of the break position in response to input of a value within a range having a maximum value associated with a most recent one of the pieces of stroke data and a having a minimum value associated with a least recent one of the pieces of stroke data.

Also, a handwritten data capture method according to a third aspect of the present disclosure is the above handwritten data capture method according to the second aspect in which the first user interface further includes that starts at the minimum value associated with the least recent one of the pieces of stroke data and ends at the maximum value associated with the most recent one of the pieces of stroke data. The first user interface also includes a handle movable along the slider. The accepting of the input of the break position is based on a position of the handle on the slider. The slider has one or more ticks each of which corresponds to one of the pieces of stroke data.

Also, a handwritten data capture method according to a fourth aspect of the present disclosure is the above handwritten data capture method according to the third aspect in which the handle is movable to positions equivalent to each of the one or more ticks and does not stop at any other location along the slider.

Also, a handwritten data capture method according to a fifth aspect of the present disclosure is the above handwritten data capture method according to the first aspect in which, further, the break position corresponds to a page break or section break, in which the given operation is the break position confirmation operation, and that includes creating a first page using one or more first pieces of stroke data currently displayed by the display device and creating a second page using one or more second pieces of stroke data other than the one or more first pieces of stroke data when the given operation is accepted and when the break position is a page break, and creating a first section using the one or more first pieces of stroke data currently displayed by the display device and creating a second section using the one or more second pieces of stroke data other than the one or more first pieces of stroke data when the break position is a section break Also, a handwritten data capture method according to a sixth aspect of the present disclosure is the above handwritten data capture method according to the fifth aspect and further including associating each of the first and second pages with order information indicating a creation order of the pages when the break position is a page break, and associating each of the first and second sections with order information indicating a creation order of the sections when the break position is a section break.

A handwritten data capture device creates handwritten data made up of a plurality of pieces of stroke data based on writing performed on each page of a paper medium having a plurality of pages. The handwritten data capture device includes a processor; and a memory storing a program that causes the processor to: acquire the plurality of pieces of stroke data created based on the writing in a writing order; display on a display device the pieces of stroke data; accept an input of a break position of the pieces of stroke data; identify a continuous portion of the pieces of stroke data based on the break position and the writing order; and update the display device to display the identified continuous portion of the pieces of stroke data in the writing order.

It is normally unlikely for a page or section to change in the middle of writing with a given handwriting (stroke) when a user handwrites on actual paper. For this reason, there is no problem of usage in identifying a break on a stroke-data-by-stroke-data basis as a data break position.

The present disclosure has been made by focusing on the above circumstances, and according to the first aspect, it is possible for a user to classify handwritten data page by page after having visually confirmed a proper break position because acts are repeated of causing the user to manipulate a break position after a handwriting written on each page of a general-purpose paper medium including a plurality of pages has been acquired, identifying a continuous portion of stroke data based on the break position, and rewriting display.

Also, in identifying a continuous portion, a portion that is continuous in a writing order is identified altogether on a stroke-data-by-stroke-data basis, imposing no significant burden on the user in identifying stroke data that should belong to a given page or the like and contributing to reduced calculation burden for the handwritten data capture device as compared to when conducting redraw for each piece of coordinate data.

Also, according to the second aspect of the present disclosure, it is possible for the user to find out about the meaning of a range by causing the user to input a value within a range with whose maximum value the most recent of the writing orders of the series of stroke data is associated and with whose minimum value the least recent of the writing orders of the series of stroke data is associated. For example, in a slider that causes one to input a value within a certain range, a GUI that causes one to input a value after depicting the upper and lower limit writing orders of a range, and so on, can intuitively prompt the user to input an input value within a proper range.

Also, according to the third aspect of the present disclosure, the slider further has one or more ticks each of which is in one-to-one correspondence with one of the series of stroke data, making it possible to depict a suitable classification position for the user in response to a process performed on a stroke-data-by-stroke-data basis.

Also, according to the fourth aspect, it is possible to bring the handle close to only a suitable classification position (i.e., stroke break position) for the user in response to a process performed on a stroke-data-by-stroke-data basis (not on a coordinate-data basis), facilitating input of a stroke break by the user.

Also, according to the fifth aspect of the present disclosure, it is possible to divide handwritten data input as data written in one page or section into two pages or sections in response to break position confirmation operation performed by the user.

Also, according to the sixth aspect of the present disclosure, it is possible to sequence the pages or sections after the division in a writing order.

DETAILED DESCRIPTION

A detailed description will be given below of a preferred embodiment of the present disclosure with reference to the accompanying drawings.

Figure 1:
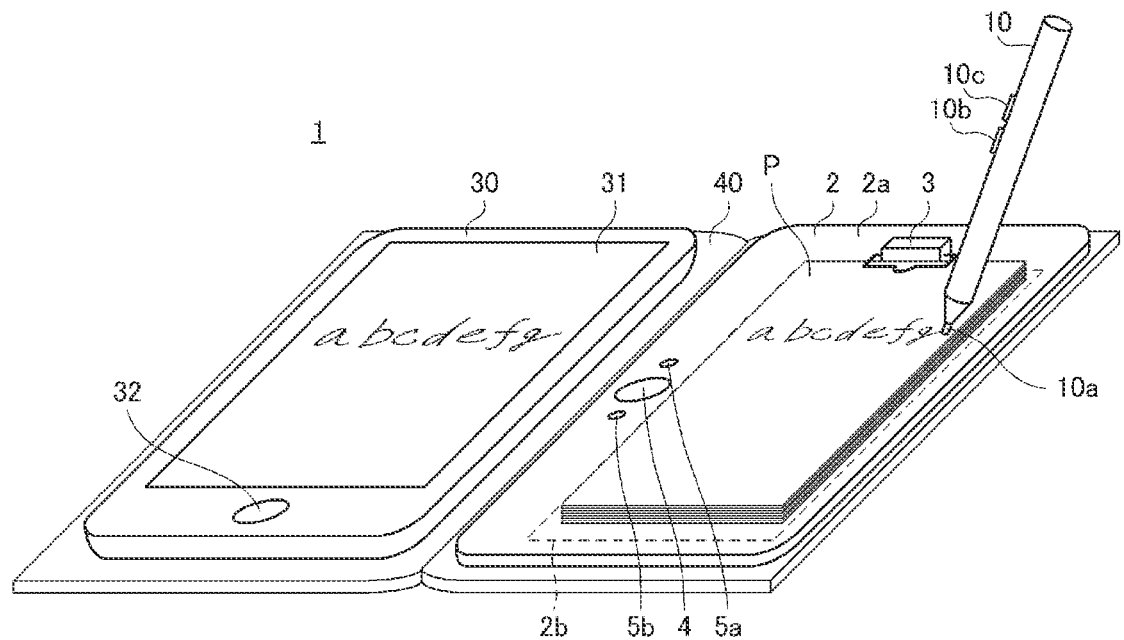
FIG. 1 is a diagram illustrating the appearance of a handwritten data capture device 1 according to an embodiment of the present disclosure.

FIG. 1 is a diagram illustrating the appearance of a handwritten data capture device 1 according to the present embodiment. As illustrated in the same figure, the handwritten data capture device 1 is configured to include a digitizer 2, an electronic pen 10, and a tablet computer 30. Of these, the digitizer 2 is a device having not only a function as a position detector making up a position detection device based on an electromagnetic resonance (EMR) method but also a function as a stationery item called clipboard. On the other hand, the electronic pen 10 is a device that has not only a function as a pointing body that can be detected by an EMR-based position detection device but also a writing instrument that leaves handwriting on the surface of a paper medium in manner that is similar to a ballpoint pen, for example. Both the digitizer 2 and the computer 30 have a flat plate appearance and are fastened to one and other faces of two-facing pages of a notebook type cover 40.

An outline of the handwritten data capture device 1 will be described first. When the user writes a letter or draws a picture on a front face (writing surface) of a report sheet P held on the digitizer 2 as a stationery item using the electronic pen 10 as a writing instrument, the handwritten data capture device 1 captures handwritten data including a series of coordinate data representing handwriting thereof using the digitizer 2 as a position detector, transfers the data to the computer 30, and displays the data on a touch screen 31 of the computer 30.

The digitizer 2 is configured to accumulate a series of successively captured coordinate data in a single file as its basic operation. The digitizer 2 does not perform a process of recognizing on which page of the report sheet P a letter is written or a picture is drawn. Therefore, if the user writes on a plurality of pages while turning over the report sheets P, a single file ends up containing coordinate data relating to handwriting on different pages. If handwritten data accumulated in this manner appears on the touch screen 31 of the computer 30, handwritings relating to a plurality of pages are displayed overlapping each other.

However, in this manner, the digitizer 2 bears no practical use. Therefore, the digitizer 2 has an operating button 4. When the user presses the operating button 4, the digitizer 2 switches a storage destination file of coordinate data to a new file. As a result, a handwritten data file is created for each page, preventing overlapping handwritings relating to a plurality of pages as described above from appearing on the touch screen 31.

However, there is a practical problem in that the user may forget to press the operating button 4. In particular, with the exception of when handwritten data is displayed in realtime on the touch screen 31 of the computer 30 (which will be described in detail later), the user must manipulate the operating button 4 without being able to visually recognize the handwritten data detected by the digitizer 2, inducing the user into forgetting to press the operating button 4. The handwritten data capture device 1 according to the present embodiment prevents the user from forgetting to press the operating button 4 thanks to a new way of lighting up LED lamps 5a and 5b provided on the digitizer 2 and, at the same time, permits the page to be divided retroactively on the computer 30 by user operation even if the user forgets to press the operating button 4. A description will be given below in a step-by-step manner.

First, the digitizer 2 will be described. The digitizer 2 as a stationery item is configured to include a flat front face 2a on which the report sheets P are held and a clip 3 provided near one end of the front face 2a. The clip 3 is configured to pinch a paper medium, and the user uses the handwritten data capture device 1 with the report sheets P pinched by the clip 3. It should be noted that although the report sheets P are used in the present embodiment, it is a matter of course that other kinds of paper media (including traditional paper and electronic paper) may be used. However, because a paper medium is held between the electronic pen 10 as a pointing body and the digitizer 2 as a position detector, paper media having an action to interfere with the passage of magnetic fields or electromagnetic waves cannot be used with the handwritten data capture device 1. The digitizer 2 as a position detector is configured to include the central processing unit (CPU) 21, a storage or memory device 23, and a touch sensor 2b. The operation of the digitizer 2 which will be described below is accomplished as the CPU 21 operates in accordance with the program stored in the storage or memory device 23. Also, the digitizer 2 operates on power supplied from an internal battery which is not depicted.

The touch sensor 2b is configured to include a plurality of loop coils LC (refer to FIG. 3 described later) arranged in a rectangular plane area, and the touch sensor 2b is arranged in part of the front face 2a as illustrated by a dotted line in FIG. 1. The specific shape, position and other characteristics of the area where the touch sensor 2b is installed are configured such that when the report sheets P are disposed on the front face 2a, the report sheets P as a whole fit inside the installation area as also depicted in FIG. 1. This is intended to ensure that user handwritings on the entire surfaces of the report sheets P can be captured as handwritten data.

The digitizer 2 has a function that acquires coordinate data indicating the position of the electronic pen 10 on the touch sensor 2b. This acquisition is conducted periodically while the electronic pen 10 is present on the touch sensor 2b. Therefore, when the electronic pen 10 moves over the touch sensor 2b, a series of coordinate data indicating a motion path (handwriting) thereof is acquired by the digitizer 2. The digitizer 2 is configured to successively accumulate the series of coordinate data acquired in this manner in a memory 23 depicted in FIG. 2 which will be described later.

Also, the digitizer 2 is configured, each time coordinate data is acquired, to acquire a variety of information about the electronic pen 10 (e.g., information indicating the force applied to a pen tip 10a from the writing surface during writing (hereinafter referred to as "pen pressure," side switch information indicating the ON/OFF states of side switches 10b and 10c; hereinafter may be collectively referred to as "pen information") and accumulate information about the electronic pen 10 in the memory 23 depicted in FIG. 2 in association with acquired coordinate data.

Here, the EMR-based digitizer 2 can acquire coordinate data and pen information of the electronic pen 10 as long as the digitizer 2 is close to the touch sensor 2b even if the electronic pen 10 is not necessarily in contact with the touch sensor 2b. Therefore, even if the report sheets P are held between the electronic pen 10 and the touch sensor 2b, the digitizer 2 can acquire coordinate data and pen information as long as the report sheet P is thick to a certain extent or less.

Conversely, when the electronic pen 10 is not in contact with the front face of the report sheet P, when nothing is actually written or drawn, and when the electronic pen 10 and the touch sensor 2b are at a certain distance or less from each other, the digitizer 2 acquires coordinate data and pen information. This is dealt with by excluding coordinate data whose associated pen pressure is zero from coordinate data for which stroke data (described later) is to be created at the time of creation of stroke data by the computer 30.

In addition to the above, the digitizer 2 is configured to include the operating button 4 and the LED lamps 5a and 5b as touched on above. All of these are arranged on the front face 2a as depicted in FIG. 1. As specific positions on the front face 2a, those not hidden even when the report sheets P are placed are selected so that the user can operate or visually recognize them while writing. The arrangement depicted in FIG. 1 is an example of such arrangements. In this example, the LED lamp 5a, the operating button 4, and the LED lamp 5b are arranged side by side along one longitudinal side of the front face 2a in this order. The specific functions and purposes of use of the operating button 4 and the LED lamps 5a and 5b will be described in detail later.

A description will be given next of the electronic pen 10. As illustrated in FIG. 1, the pen tip 10a is provided on one end of the electronic pen 10. While pressing the pen tip 10a against the front face of the report sheet P, the user writes a letter or draws a picture by moving the pressed position.

Although not illustrated, the electronic pen 10 as a writing material is configured, for example, as a ballpoint pen including a thin tube and an oozing section. The thin tube stores ink. The oozing section causes ink, stored in the tube, to ooze out from the pen tip 10a. In this case, a handwriting is marked on the writing surface by the ink that oozed out from the pen tip 10a through the oozing section.

It should be noted that the necessary function of the electronic pen 10 as a writing material is essentially a function to write on a paper medium placed on the front face of the digitizer 2. Therefore, it is not mandatory for the electronic pen 10 to have a ballpoint pen function as described above, and the electronic pen 10 may be configured to write using graphite, for example, as does a pencil or a mechanical pencil. On the other hand, when heat-sensitive paper or electronic paper is used, for example, the electronic pen 10 may be configured as a stylus having no capability to place ink or graphite on the writing surface.

The electronic pen 10 as a pointing body is configured to include the side switches 10b and 10c depicted and a resonance circuit (see FIG. 2 described later) which, although not depicted in FIG. 1, plays a role of extracting operating power from the magnetic field (described later) generated by the digitizer 2 and sending signals to the digitizer 2. Also, the electronic pen 10 is configured to include a side switch information acquisition circuit (not depicted) that acquires side switch information indicating the ON/OFF state of each of the side switches 10b and 10c. It should be noted that it is not mandatory to provide side switches on the electronic pen 10 and that if they are provided, the number thereof may be one or more and is not limited to two.

A further detailed description will be given below of the configuration and functions of the position detection device made up thereof with reference to the internal configurations of the electronic pen 10 and the digitizer 2.

Figure 2:
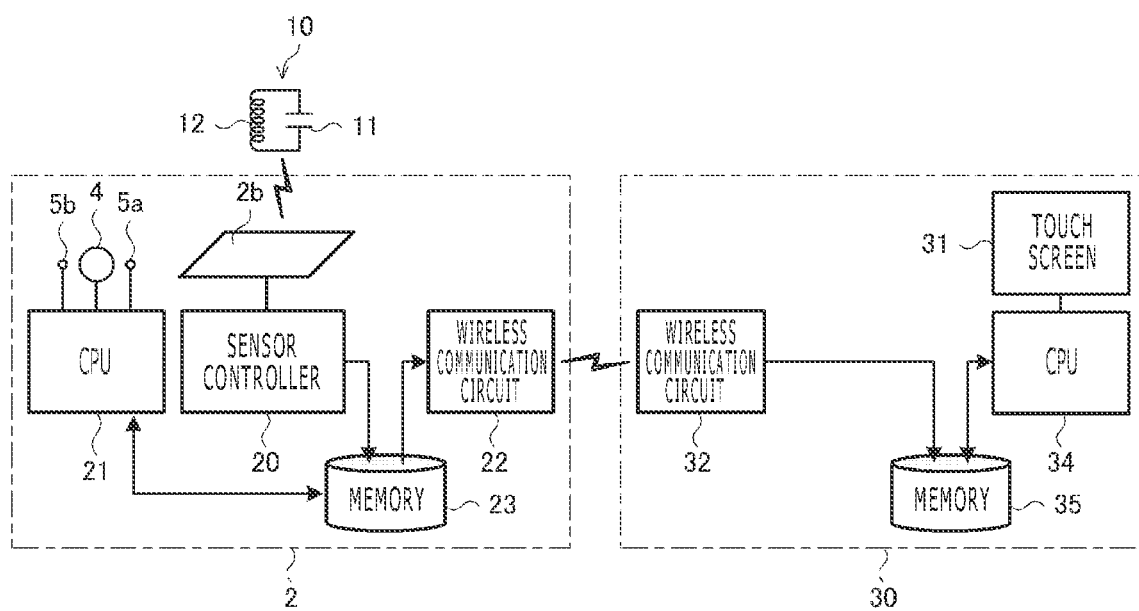
FIG. 2 is a diagram illustrating examples of internal configurations of an electronic pen 10, a digitizer 2, and a computer 30 depicted in FIG. 1.

FIG. 2 illustrates internal configurations of the electronic pen 10 and the digitizer 2. As illustrated in the same figure, the electronic pen 10 is configured to include an LC resonance circuit that includes a capacitor 11 and an inductor 12. On the other hand, the digitizer 2 is configured to include a sensor controller 20, the CPU 21, a wireless communication circuit 22, and the memory 23.

The inductor 12 of the electronic pen 10 plays a role of generating an induced voltage proportional to the magnetic field supplied from the touch sensor 2b of the digitizer 2 and charging the capacitor 11. After the supply of a magnetic field from the touch sensor 2b is halted, the inductor 12 sends a reflection signal to the digitizer 2 using the voltage stored in the capacitor 11. The reflection signal sent in this manner includes a continuous signal for position detection, a start signal indicating the end of the continuous signal, and side switch information in this order.

The capacitor 11 is configured such that the capacitance thereof changes with the force (pen pressure) applied to the pen tip 10a of the electronic pen 10 (FIG. 1) from the writing surface. As the capacitance of the capacitor 11 changes, so does the resonance frequency of the resonance circuit, thus causing the frequency of the reflection signal sent as described above to change with the pen pressure. This change in frequency is used by the digitizer 2 to detect the pen pressure. A detailed description will be given later.

The sensor controller 20 of the digitizer 2 is configured to have a function to periodically acquire coordinate data indicating the position of the electronic pen 10 on the touch sensor 2b, acquire pen information of the electronic pen 10 each time coordinate data is acquired, and store coordinate data and pen information in association in the memory 23.

Figure 3:
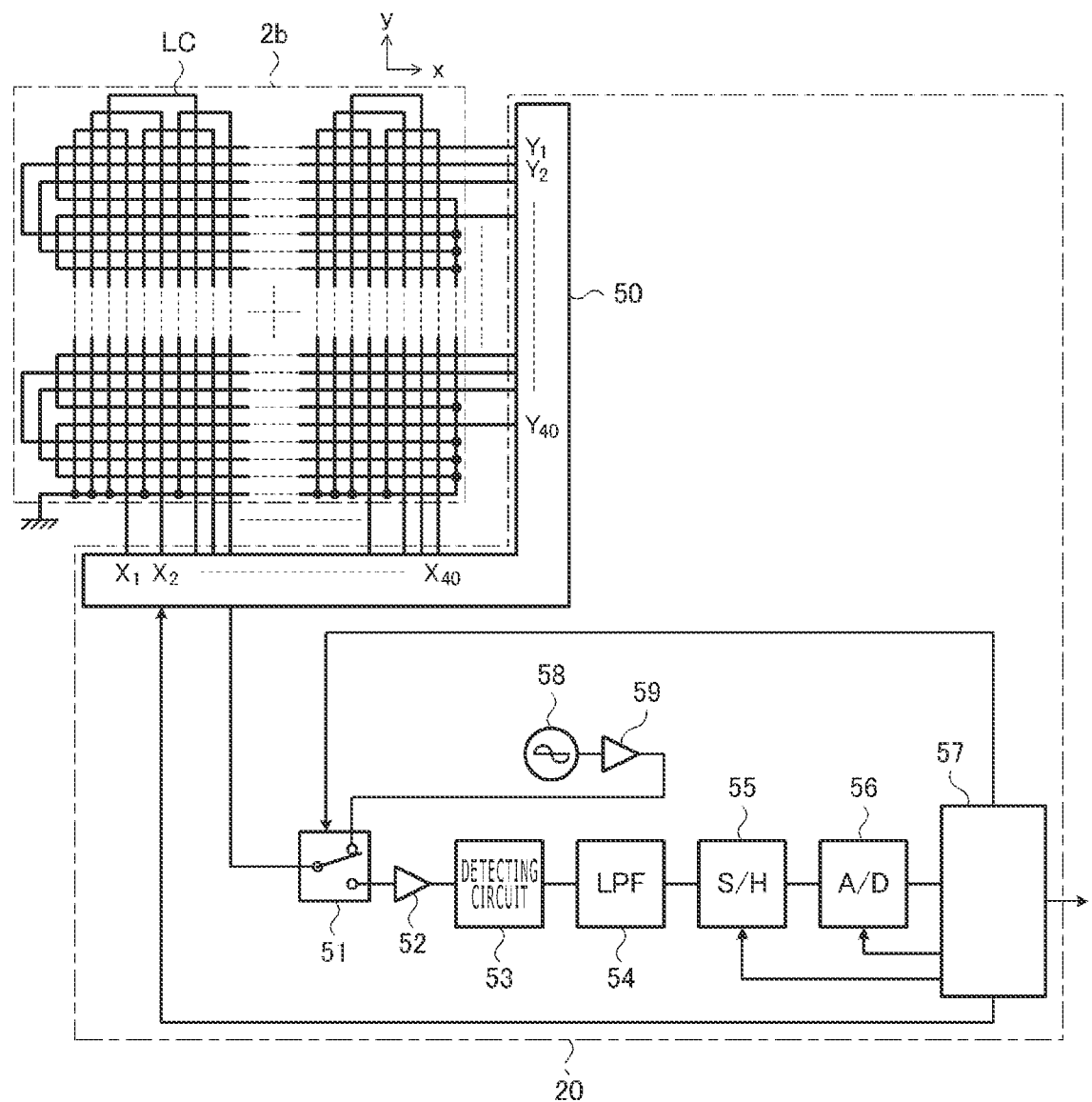
FIG. 3 is a diagram illustrating examples of internal configurations of a touch sensor 2b and a sensor controller 20 depicted in FIG. 2.

FIG. 3 is a diagram illustrating internal configurations of the touch sensor 2b and the sensor controller 20. As illustrated in the same figure, first, the touch sensor 2b is configured so that the plurality of loop coils LC are arranged in a rectangular plane area. Each of the loop coils LC has its one end grounded and its other end connected to the sensor controller 20. FIG. 3 illustrates 40 loop coils $X_1$ to $X_{40}$ extending in the y direction depicted and 40 loop coils $Y_1$ to $Y_{40}$ extending in the x direction orthogonal to the y direction as an example of the plurality of loop coils LC. The description will be continued below on the premise that these 80 loop coils $X_1$ to $X_{40}$ and $Y_1$ to $Y_{40}$ are used. However, the number of loop coils LC provided in the touch sensor 2b is not limited thereto.

As illustrated in FIG. 3, the sensor controller 20 is configured to include a selection circuit 50, a switch circuit 51, an amplifier 52, a detection circuit 53, a low-pass filter (LPF) 54, a sample-hold circuit (S/H) 55, an analog-digital conversion circuit (A/D) 56, a controller 57, an oscillator 58, and a current driver 59.

The other end of each of the loop coils LC is connected to the selection circuit 50. The selection circuit 50 is a circuit that selects one or a plurality from among the loop coils $X_1$ to $X_{40}$ and $Y_1$ to $Y_{40}$ under control of the controller 57 and connects the selected one or ones to the switch circuit 51.

The switch circuit 51 is a switch with one common terminal and two selection terminals and is configured to switch between the selection terminals connected to the common terminal under control of the controller 57. The selection circuit 50 is connected to the common terminal of the switch circuit 51, and the input end of the amplifier 52 is connected to one of the selection terminals, and the output end of the current driver 59 is connected to the other selection terminal.

The amplifier 52 is a circuit that amplifies the voltage signal supplied from the selection circuit 50 via the switch circuit 51 and outputs the amplified signal to the detection circuit 53. The detection circuit 53 is a circuit that generates an envelope signal by detecting the envelope of the voltage signal output from the amplifier 52 and outputs the envelope signal to the low-pass filter 54. The low-pass filter 54 plays a role of removing high frequency components from the envelop signal generated by the detection circuit 53. The sample-hold circuit 55 is configured to perform a sampling operation and a holding operation on the envelope signal whose high frequency components have been removed by the low-pass filter 54 at a given time interval. The analog-digital conversion circuit 56 generates a digital signal by performing analog-to-digital conversion of the signal held by the sample-hold circuit 55 and outputs the digital signal to the controller 57.

The controller 57 is a processor that operates in accordance with the program stored in the storage device which is not depicted. The operation handled by the controller 57 includes a process of controlling the selection circuit 50, the switch circuit 51, the sample-hold circuit 55, and the analog-digital conversion circuit 56 and a process of acquiring coordinate data and pen information of the electronic pen 10.

The oscillator 58 is configured to generate an alternating current (AC) signal at a given frequency. The current driver 59 plays a role of converting an AC signal output from the oscillator 58 into a current signal and supplying the current signal to the switch circuit 51.

A specific description will be given of acquisition of coordinate data and pen information by the controller 57. First, the controller 57 connects the other selection terminal of the switch circuit 51 (selection terminal connected to the current driver 59) to the common terminal and causes the selection circuit 50 to select one of the loop coils $X_1$ to $X_{40}$ and $Y_1$ to $Y_{40}$. As a result, a magnetic field develops in the selected loop coil LC because of the current signal output from the current driver 59. It should be noted that although only one loop coil LC is selected here, a total of two coils, one from among the loop coils $X_1$ to $X_{40}$ and one from among the loop coils $Y_1$ to $Y_{40}$, for example, may be selected. Alternatively, a dedicated loop coil for generating a magnetic field may be provided separately from the loop coils $X_1$ to $X_{40}$ and $Y_1$ to $Y_{40}$ along the outer perimeter of the touch sensor 2b so that only the dedicated loop coil is selected in this stage.

When the electronic pen 10 enters the magnetic field that has developed in the loop coil LC, an induced voltage develops in the inductor 12 (FIG. 2) of the electronic pen 10, charging the capacitor 11 (FIG. 2) as described above. When a given amount of time elapses after the other selection terminal of the switch circuit 51 has been connected to the common terminal, the controller 57 connects, this time, the one selection terminal of the switch circuit 51 (selection terminal connected to the amplifier 52) to the common terminal. As a result, the magnetic field stops developing in the loop coil LC. In response thereto, the electronic pen 10 initiates the transmission of the reflection signal (signal including a continuous signal, a start signal, and side switch information in this order) described above.

The controller 57 is configured to determine the details of the reflection signal sent by the electronic pen 10 by demodulating the digital signal supplied from the analog-digital conversion circuit 56. Then, while the electronic pen 10 sends a continuous signal, the controller 57 scans the voltage that develops in each of the loop coils $X_1$ to $X_{40}$ and $Y_1$ to $Y_{40}$ by continuously switching the loop coil LC selected by the selection circuit 50 from one to the other. The shorter the distance between the loop coil LC and the electronic pen 10, the larger the voltage detected in this manner, allowing the controller 57 to acquire coordinate data indicating the position of the electronic pen 10 from the scanning results.

It should be noted that, to reduce the scanning time, the position detection by scanning all the loop coils LC as described above may be conducted only at the first scan (in this case, during the first position detection, while the electronic pen 10 is sending a start signal and pen information, position detection is conducted by regarding these as continuous signals), and from the second scan and beyond, only the loop coils LC located near the previously detected position may be scanned.

On the other hand, while the electronic pen 10 is sending side switch information, the controller 57 causes the selection circuit 50 to select one of the loop coils LC (normally, the loop coil closest to the detected position of the electronic pen 10) in accordance with the detected position of the electronic pen 10. Then, the controller 57 is configured to acquire side switch information sent by the electronic pen 10 from the decoding results of the signal acquired via the loop coil LC selected in this manner.

Here, the frequency of the reflection signal sent by the electronic pen 10 changes with the pen pressure as described above. The controller 57 is configured to detect the frequency of the reflection signal sent by the electronic pen 10 and acquire the pen pressure of the electronic pen 10 from the detected frequency.

The controller 57 successively accumulates coordinate data and pen information (pen pressure and side switch information) acquired as described above in the memory 23 depicted in FIG. 2 in association with timestamp information indicating the time when the acquisition thereof is complete. The memory 23 is configured to manage data on a file-by-file basis, and the controller 57 performs a process of accumulating the acquired coordinate data and pen information in the memory 23 by writing these to a file in the memory 23.

Referring back to FIG. 2, the CPU 21 is configured to have a function to perform a process that matches with the pressed state of the operating button 4 and a function to control the lighting states of the LED lamps 5a and 5b.

The operating button 4 is an operation acceptance means that accepts a given operation by the user. A description will be given below of the processes performed by the CPU 21 in relation to the operating button 4 with reference to Table 1 depicted next.

TABLE 1

| Mode | Condition | Operation |
| --- | --- | --- |
| Scan mode | Non-operation continues for given time period | Switch to sleep mode |
| | Long pressing of operating button 4 detected | Search for electronic pen 10 again |
| | Short pressing of operation button 4 detected | Switch file |
| Sleep mode | Short pressing of operation button 4 detected | Switch to scan mode |

As illustrated in Table 1, the digitizer 2 has two modes, scan mode and sleep mode. Scan mode is a mode in which the electronic pen 10 is searched for (the position thereof is detected) and coordinate data and pen information of the electronic pen 10 found as a result of the search is acquired. On the other hand, these are not performed in sleep mode. As illustrated in Table 1, in scan mode, the digitizer 2 switches to sleep mode automatically, i.e., regardless of user operation if a non-operation state (state in which the operating button 4 is not operated and the electronic pen 10 is not detected) for a given time period (e.g., 30 minutes). When the user presses the operating button 4 for a short time (e.g., when the user presses and holds the button for less than 5 seconds) after the digitizer 2 has switched to sleep mode, the CPU 21 switches the digitizer 2 to scan mode.

When the user presses the operating button 4 for a long time (e.g., when the user presses and holds the button for 5 seconds or more) with the digitizer 2 in scan mode, the CPU 21 causes the sensor controller 20 to search for the electronic pen 10 again. That is, the CPU 21 causes the sensor controller 20 to perform the position detection (first position detection described above) again that is conducted by scanning all the loop coils LC.

On the other hand, when the user presses the operating button 4 for a short time (e.g., when the user presses and holds the button for less than 5 seconds) with the digitizer 2 in scan mode, the CPU 21 performs a process that switches the storage destination of coordinate data and so on stored by the sensor controller 20 from the file used up to that time (first area in the memory 23) to a new file (second area in the memory 23). As a result, assuming that the user presses the operating button 4 without fail when he or she turns over the page of the report sheet P, a handwritten data file is created for each report sheet P.

Figure 4:
FIG. 4 is a diagram illustrating an example of a handwritten data file according to an embodiment of the present disclosure.

FIG. 4 illustrates an example of a handwritten data file created in this manner. As illustrated in the same figure, the sensor controller 20 successively outputs data that includes coordinate data (X,Y), the pen pressure P, the side switch information SW1 and SW2, and timestamp information time (this data will be hereinafter referred to as "unit handwritten data"). It should be noted that the side switch information SW1 and SW2 corresponds to the side switches 10b and 10c (FIG. 1) of the electronic pen 10, respectively. Output unit handwritten data is stored in a file in the memory 23. In response to the pressing of the operating button 4, however, the file that has been storing unit handwritten data up to that time (e.g., file #1) is closed, and a new storage file (e.g., file #2) is created anew. Timestamp information time that corresponds to the latest unit handwritten data included therein is associated with each file. This makes it possible for the computer 30 or the like to find out about the writing order between the files when it refers to each file later.

Referring back to FIG. 2, each of the LED lamps 5a and 5b is a light-emitting element and functions as a notification means having a user notification function. A detailed description will be given below of controlling of the lighting states of the LED lamps 5a and 5b by the CPU 21 with reference to Table 2 depicted next.

TABLE 2

| Condition | Priority | Control Target | Lighting State |
| --- | --- | --- | --- |
| No space remaining in the memory 23 | 1 | 5a | Flashing amber |
| | | 5b | Flashing green |
| Remaining charge of built-in battery drops to given level or less | 2 | 5a | Flashing amber |
| Charging built-in battery | | 5a | Lit amber |
| Sleep mode | 3 | 5a | Unlit |
| | | 5b | Unlit |
| Searching for electronic pen 10 | | 5b | Flashing green |
| Acquiring unit handwritten data (pen-up state, but no data stored in file that is accumulating data) | | 5b | Lit light green |
| Acquiring unit handwritten data (pen-down state) | | 5b | Flashing green |
| Acquiring unit handwritten data (pen-up state, but data stored in file that is accumulating data) | | 5b | Flashing light green slowly |
| Switching between files | | 5b | Flashing light green fast (3 times) |

Table 2 illustrates control conditions, priorities for controlling lighting, LED lamps to be controlled, and controlled lighting states. As illustrated in the same table, first if there is no space remaining in the memory 23, the CPU 21 causes the LED lamp 5a to flash amber and the LED lamp 5b to flash green. This lighting state can have a significant impact on the user, and the user can find out, at the sight of the lighting state, that new handwritten data cannot be stored in the memory 23. In this case, the user causes the wireless communication circuit 22, which will be described later, to send the file, stored in the memory 23, to the computer 30, for example, by performing an operation on the computer 30. This makes it possible to reserve free space in the memory 23. It should be noted that this lighting control is performed with priority over other types of lighting control which will be described below.

If the remaining charge of the battery built into the digitizer 2 drops to a given level or less, the CPU 21 causes the LED lamp 5a to flash amber. If the battery built into the digitizer 2 is being charged, the CPU 21 also causes the LED lamp 5a to flash amber. As a result, the user can recognize the need to charge the built-in battery and that the built-in battery is being charged by referring to the LED lamp 5a. It should be noted that these lighting control tasks are not performed if there is no space remaining in the memory 23.

Next, when the digitizer 2 is in sleep mode, the CPU 21 extinguishes both of the LED lamps 5a and 5b. On the other hand, when the digitizer 2 is in scan mode, the CPU 21 controls the lighting state of the LED lamp 5b as follows. That is, first when the electronic pen 10 is being searched for, the CPU 21 causes the LED lamp 5b to flash green (first color). Also, when the acquisition of unit handwritten data is underway after the search of the electronic pen 10 has ended, and the electronic pen 10 is in a pen-up state, and not a single piece of unit handwritten data has been stored in the file that is currently accumulating unit handwritten data, the CPU 21 causes the LED lamp 5b to light up light green (second color). Further, when the acquisition of unit handwritten data is underway, and the electronic pen 10 is in a pen-down state, the CPU 21 causes the LED lamp 5b to light up green. Then, when the acquisition of unit handwritten data is underway, and the electronic pen 10 is in a pen-up state, and one or more pieces of unit handwritten data are stored in the file that is currently accumulating unit handwritten data, the CPU 21 causes the LED lamp 5b to flash light green slowly. Finally, when the target storage file is switched after the operating button 4 has been pressed, the CPU 21 causes the LED lamp 5b to flash light green fast only three times. It should be noted that as for the determination as to whether the electronic pen 10 is in a pen-up state or pen-down state, the CPU 21 monitors the pen pressure included in the pen information output from the sensor controller 20 and determines that the electronic pen 10 is in a "pen-up state" when the pen pressure is 0 and that the electronic pen 10 is in a "pen-down state" in any other case.

What is particularly important in controlling the lighting state of the LED lamp 5b in scan mode is to cause the LED lamp 5b to flash slowly. In this case, one or more pieces of unit handwritten data are stored in the file that is accumulating the data. Moreover, considering the fact that the electronic pen 10 is in a pen-up state, there is a possibility that the user may intend to terminate writing on a certain page and move to the next page. For this reason, the CPU 21 causes the LED lamp 5b to flash light green slowly, a characteristic lighting state, calling the user's attention by insinuating, "Are you sure you do not want to change the file for accumulating unit handwritten data?" If the user really intends to change pages, the user whose attention has been called by the lighting state needs only to switch the file by pressing the operating button 4.

A more detailed description will be given again of the lighting control of the LED lamp 5b with reference to the processing flow of the CPU 21.

Figure 5:
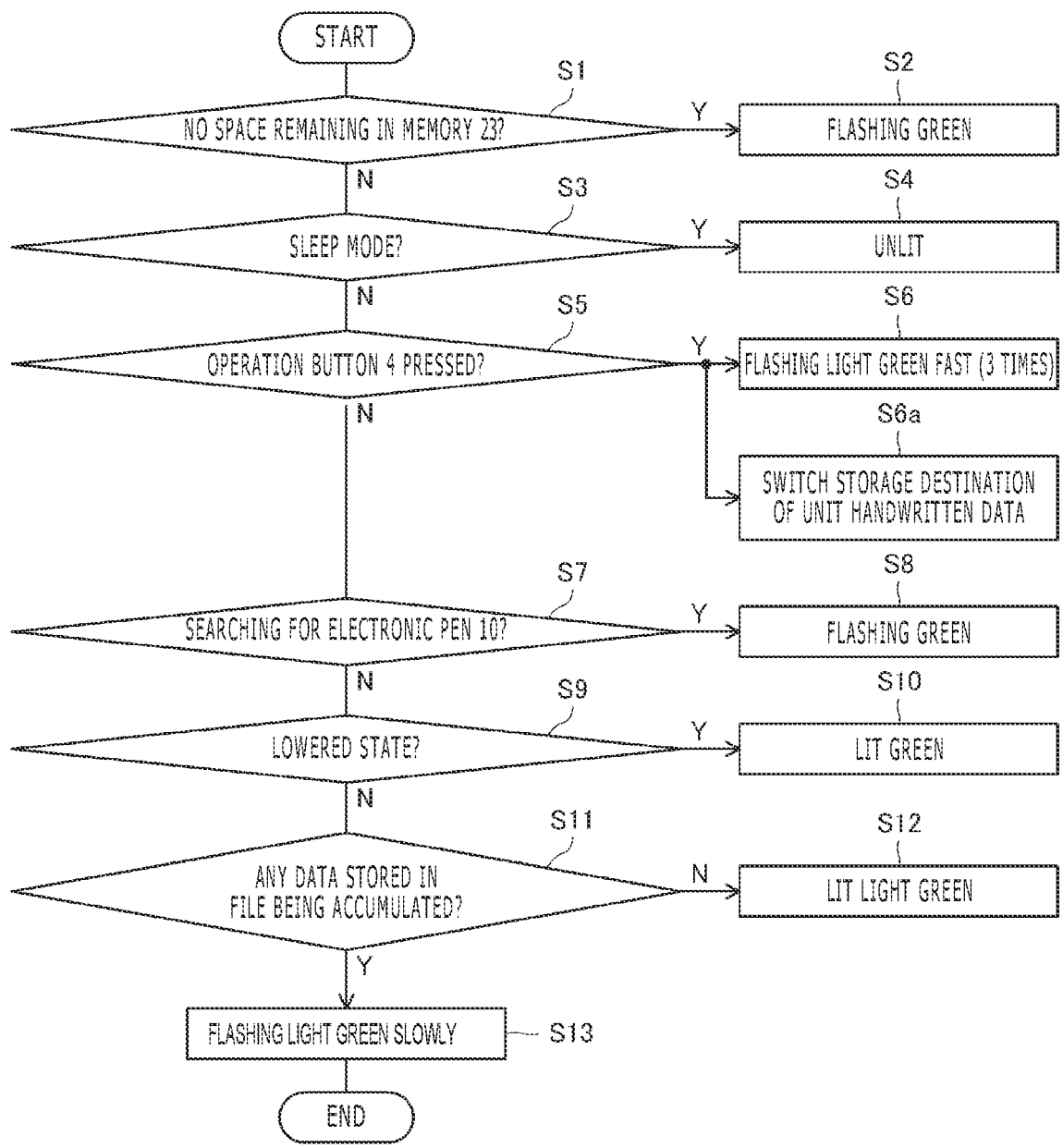
FIG. 5 is a diagram illustrating an example of a processing flow of a central processing unit (CPU) 21 that controls lighting of a light-emitting diode (LED) lamp 5b depicted in FIG. 2.

FIG. 5 is a diagram illustrating the processing flow of the CPU 21 relating to lighting control of the LED lamp 5b. It should be noted that FIG. 5 partially depicts another processing task (S6a which will be described later). The processing flow depicted in the same figure is periodically repeated by the CPU 21.

As illustrated in FIG. 5, the CPU 21 determines first whether there is no space remaining in the memory 23 (S1). As a result, if there is no space remaining in the memory 23, the CPU 21 causes the LED lamp 5b to flash green (S2). On the other hand, when there is space remaining in the memory 23, the CPU 21 determines next whether the digitizer 2 is in sleep mode (S3). As a result, when the digitizer 2 is in sleep mode, the CPU 21 extinguishes the LED lamp 5b (S4). On the other hand, when the digitizer 2 is not in sleep mode, the CPU 21 determines whether the operating button 4 was pressed (S5). As a result, when the operating button 4 was pressed, the CPU 21 causes the LED lamp 5b to flash light green fast three times (S6). At this time, the CPU 21 also performs a process that switches the storage destination of unit handwritten data stored by the sensor controller 20 from the file used up to then to a new file (S6a).

When the operating button 4 was not pressed at S5, the CPU 21 determines next whether the sensor controller 20 is searching for the electronic pen 10 (S7). As a result, when the sensor controller 20 is searching for the electronic pen 10, the CPU 21 causes the LED lamp 5b to flash green (S8). On the other hand, when the sensor controller 20 is not searching for the electronic pen 10, the CPU 21 determines next whether the electronic pen 10 is in a pen-down state (S9). This determination is made by monitoring the pen pressure output from the sensor controller 20 as described above. When the electronic pen 10 is in a pen-down state as a result of the determination, the CPU 21 causes the LED lamp 5b to light up green (third notification; S10). On the other hand, when the electronic pen 10 is not in a pen-down state, the CPU 21 determines whether unit handwritten data is already stored in the file that is accumulating the data (S11). As a result, when unit handwritten data is not already stored in the file, the CPU 21 causes the LED lamp 5b to light up light green (second notification; S12). When unit handwritten data is stored in the file, the CPU 21 causes the LED lamp 5b to flash light green slowly (first notification; S13).

As the CPU 21 controls lighting of the LED lamp 5b as described above, it is possible to issue, to the user, a notification to the effect: "Are you sure you do not want to change the file for accumulating unit handwritten data?," when the user intends to terminate writing on a certain page and move to the next page as described above.

Referring back to FIG. 2, the wireless communication circuit 22, in operation, sends the file accumulated in the memory 23 to the computer 30 through wireless communication. The file transmission by the wireless communication circuit 22 may be conducted in response to user operation on the digitizer 2 or in response to reception of a transmission instruction from the computer 30. In the latter case, the computer 30 may send a transmission instruction to the digitizer 2 in response to a user operation on the computer 30. Also, the wireless communication circuit 22 may automatically send the file when the digitizer 2 and the computer 30 approach each other to a distance of possible communication. Specifically, for example, Bluetooth (registered trademark) is suitable for use as the above wireless communication. However, other communication standards such as Wi-Fi (registered trademark) and NFC (registered trademark) can also be used.

It should be noted that although the wireless communication circuit 22 according to the present embodiment sends handwritten data on a file-by-file basis, the wireless communication circuit 22 may send handwritten data every time one coordinate set worth of handwritten data is accumulated in the memory 23 by the sensor controller 20. This makes it possible to display handwritten data on the touch screen 31 of the computer 30 in realtime. This is also effective when handwritten data is displayed on electronic paper as a paper medium as described in Japanese Patent Laid-Open No. 2007-206845 and Japanese Patent Laid-Open No. 2003-022257. It should be noted that when the operating button 4 is pressed, the wireless communication circuit 22 preferably notifies the computer 30 to that effect. This makes it possible for the computer 30 side to have the file switching function that is possessed by the CPU 21 in the present embodiment.

Referring back to FIG. 1, the computer 30 will be described next. The computer 30 is a tablet computer and is configured to include the touch screen 31 and an operating button 32. The computer 30 includes a CPU 34 and a storage or memory device 35, and the operation of the computer 30 described below is performed as the CPU 34 operates in accordance with the program stored in the storage or memory device 35. Also, the touch screen 31 is configured to detect user touch operation (including tap operations and slide operations), and the computer 30 is configured to perform an operation that matches with the user operation detected by the touch screen 31 and the pressed state of the operating button 32.

It should be noted that although a case will be described in the present embodiment in which a tablet computer is used as the computer 30, the computer 30 as a component of the handwritten data capture device 1 may not necessarily be a tablet computer and may be, for example, a desktop or laptop computer. Also, as depicted in FIG. 1, it is not mandatory to contain the computer 30 and the digitizer 2 in the single notebook type cover 40. Also, electronic paper as a paper medium placed on the digitizer 2 may have functions as the computer 30. Also, the computer 30 may be configured to perform an operation that matches with operation using a mouse or keyboard together with or rather than user touch operation.

FIG. 2 also illustrates the internal configuration of the computer 30. As illustrated in the same figure, the computer 30 is configured to include a wireless communication circuit 32, a CPU 34, and a memory 35 therein.

The wireless communication circuit 32, in operations, receives a series of handwritten data from the digitizer 2 and supplies the data to the CPU 34. The CPU 34 is configured to create stroke data, drawing vector data, based on the series of handwritten data supplied in this manner and store the data in the memory 35.

FIG. 4 also illustrates a specific example of data stored in the memory 35 by the CPU 34. As illustrated in the same figure, the CPU 34 performs a process of combining one or more pieces of unit handwritten data stored in each file into stroke-by-stroke data (stroke data).

How specifically stroke data is created will be described. In order to create stroke data from a series of unit handwritten data, it is necessary to determine breaks between strokes. The CPU 34 determines these breaks by referring to the pen pressure in each piece of unit handwritten data. That is, unit handwritten data whose associated pen pressure is zero is data that was acquired when the electronic pen 10 was in a pen-up state and, therefore, does not contribute to handwriting. For this reason, the CPU 34 excludes such unit handwritten data from data from which to create stroke data and determines that the portion that includes the excluded unit handwritten data is a break between strokes. Then, the CPU 34 creates a piece of stroke data from a set of one or more pieces of unit handwritten data identified by this break.

When creating stroke data, the CPU 34 assigns order information to each piece of a series of stroke data created by referring to the timestamp information of each piece of the unit handwritten data. As a result, the stroke data in the file stored in the memory 35 is sequenced in the writing order. In the example depicted in FIG. 4, the data marked "order n" (where n is a natural number) is order information, and natural number 'n' indicates the writing order.

Thus, the CPU 34 of the present disclosure retains each piece of stroke data as vector data together with the writing order without rasterizing the handwritten data (changing into pixel data). As a result, the CPU 34 retains the stroke data in the memory 35 in such a manner that the stroke data based on the writing order can be identified in the process which will be described later.

Referring back to FIG. 2, the CPU 34 is configured to have a function to extract the file stored in the memory 35, perform a process of drawing each piece of stroke data included in the file, and display the drawing results on the touch screen 31 and a function to recognize a user touch operation on the touch screen 31 and perform a process that matches with the details thereof.

Figure 6:
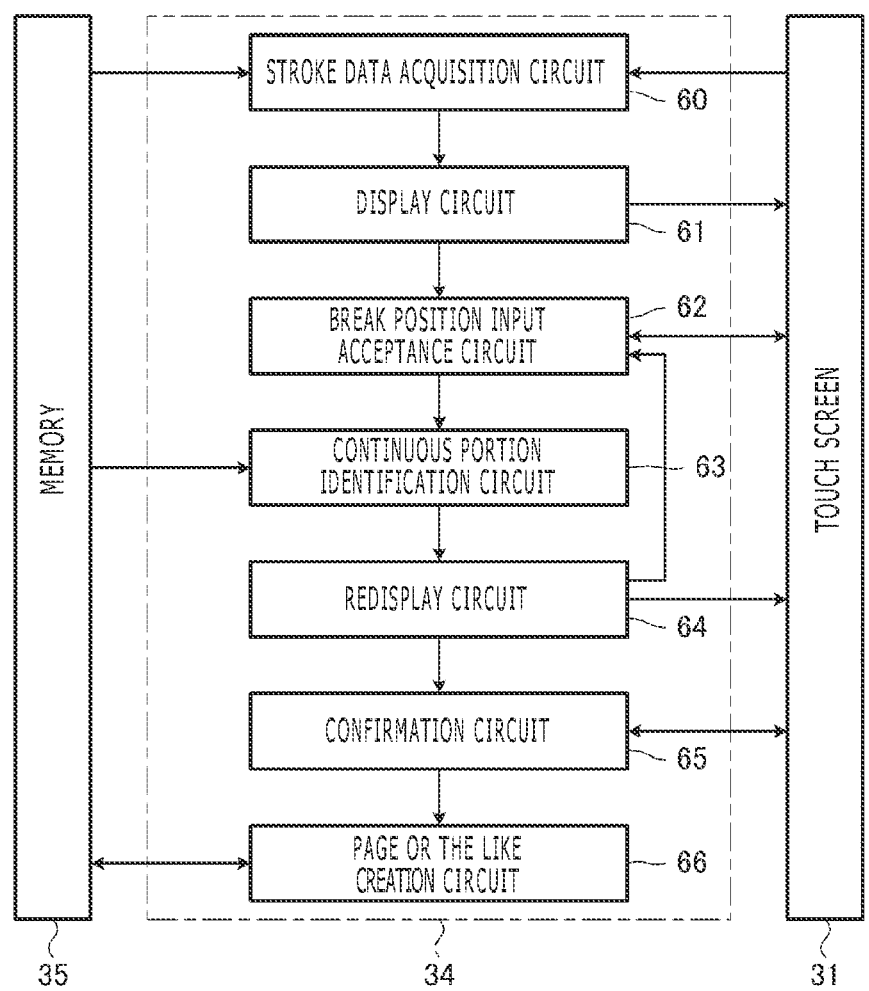
FIG. 6 is a diagram illustrating an example of a block diagram of a CPU 34 depicted in FIG. 2.

FIG. 6 is a diagram illustrating a block diagram of the CPU 34. As illustrated in the same figure, the CPU 34 is configured to include a stroke data acquisition circuit 60, a display circuit 61, a break position input acceptance circuit 62, a continuous portion identification circuit 63, a redisplay circuit 64, a confirmation acceptance circuit 65, and a page or the like creation circuit 66.

The stroke data acquisition circuit 60, in operation, acquires a series of stroke data included in data corresponding to one page from the memory 35. In this example, data corresponding to one page is included in one file. The term "one page" here may be one of a plurality of sections included in a certain file. Also, each of the pages or sections may be a specific area in the file specified by a start byte position and an end byte position or may be that which is extracted from the file by a break code. In the description given below, the expression "page or the like" may be used to refer to a page or section. The display circuit 61 performs a given process of drawing all the series of stroke data acquired by the stroke data acquisition circuit 60 and displays the results thereof on the touch screen 31 (display device).

Figure 7:
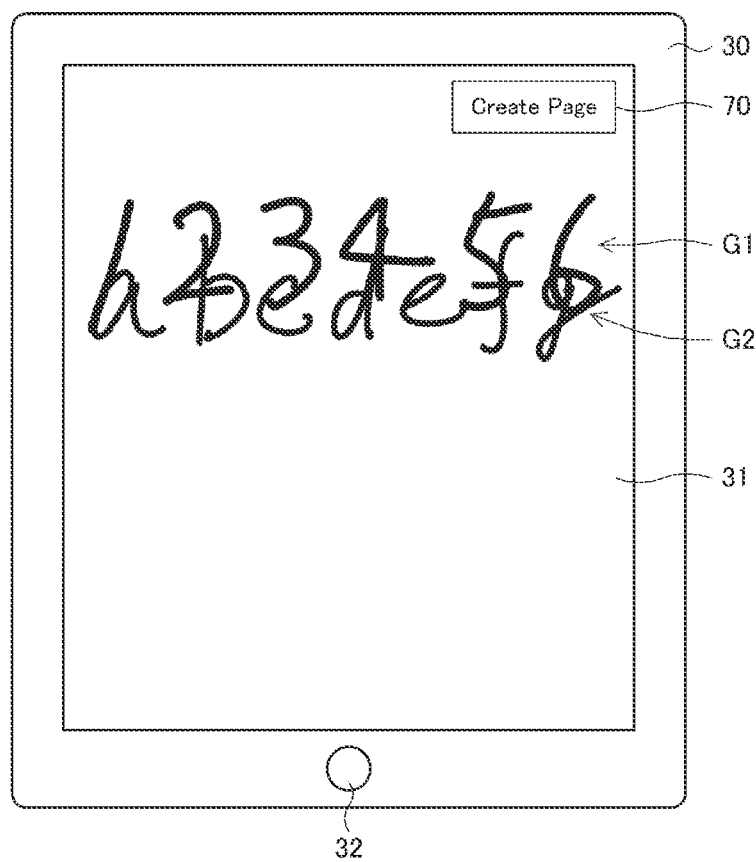
FIG. 7 is a diagram illustrating a display example of a touch screen 31 that accepts a display process performed by a display circuit 61 depicted in FIG. 6.

FIG. 7 is a diagram illustrating a display example of the touch screen 31 that accepts a display process performed by the display circuit 61. In the example depicted in the same figure, it is assumed that the page or the like to be displayed includes two pages worth of stroke data of the report sheets P, i.e., a stroke data group G1 made up of eight pieces of stroke data indicating "123456" (note: each of "4" and "5" contains two strokes) and a stroke data group G2 made up of nine pieces of stroke data indicating "abcdefg" (note: each of "b" and "f" contains two strokes). It is also assumed that the writing order of these pieces of stroke data (writing order indicated by order information) is the first strokes of "1," "2," "3," and "4," the second stroke of "4," the first stroke of "5," the second stroke of "5," the first strokes of "6," "a," and "b," the second stroke of "b," the first strokes of "c," "d," "e," and "f," the second stroke of "f," and "g." The user recognizes that he or she wrote the stroke data group G1 and the stroke data group G2 on different pages. However, the user forgot to press the operating button 4 when changing pages. Therefore, the two stroke data groups are included in the single page or the like. As a result, "123456" and "abcdefg" are displayed overlapping each other on one screen as illustrated in FIG. 7.

Referring back to FIG. 6, the break position input acceptance circuit 62, in operation, accepts break position inputs of the series of stroke data acquired by the stroke data acquisition circuit 60. Break positions correspond to page breaks or section breaks.

Figure 8:
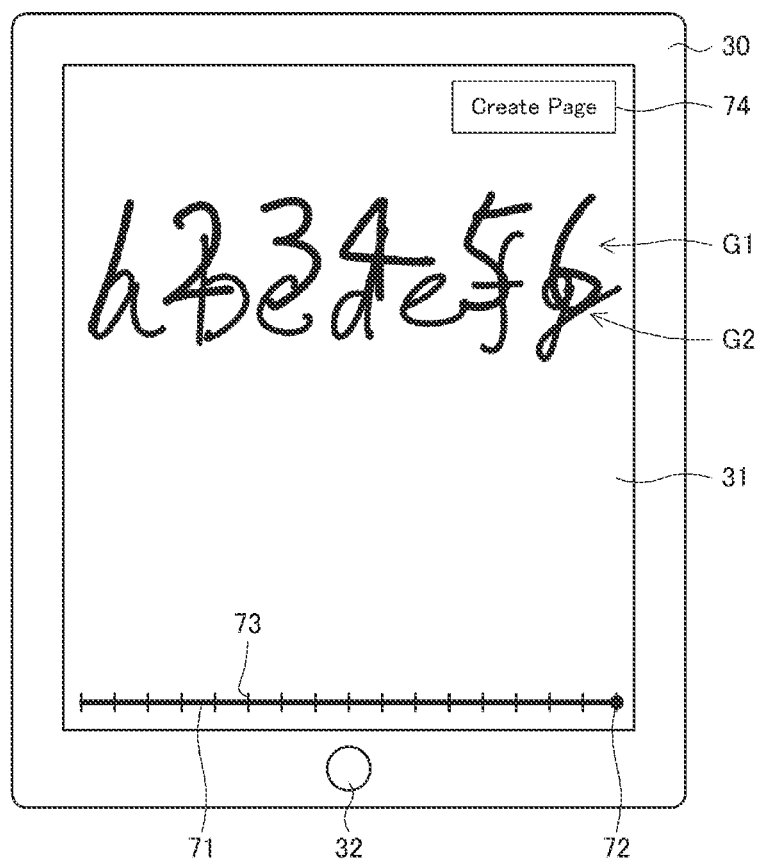
FIG. 8 is a diagram illustrating a display example of the touch screen 31 after a user taps a touch button 70 depicted in FIG. 7.

Also, as depicted in FIG. 7, the break position input acceptance circuit 62 is configured to display a touch button 70 for causing the user to issue an instruction to switch to page edit mode. When this touch button 70 is tapped by the user, the break position input acceptance circuit 62 erases the touch button 70 and displays, anew, a slider 71 (first user interface) for causing the user to specify a break position and a touch button 74 (second user interface) for causing the user to perform an operation to confirm the break position as illustrated in FIG. 8.

The configurations of the touch button 70, the slider 71, and the touch button 74 will be described specifically. First, both the touch buttons 70 and 74 are buttons for accepting user tap operation. FIGS. 7 and 8 illustrate examples in which both of the touch buttons have a rectangular area marked "Create Page." It should be noted, however, that it is not mandatory for the touch buttons 70 and 74 to have the same configuration in this manner.

Figure 9:
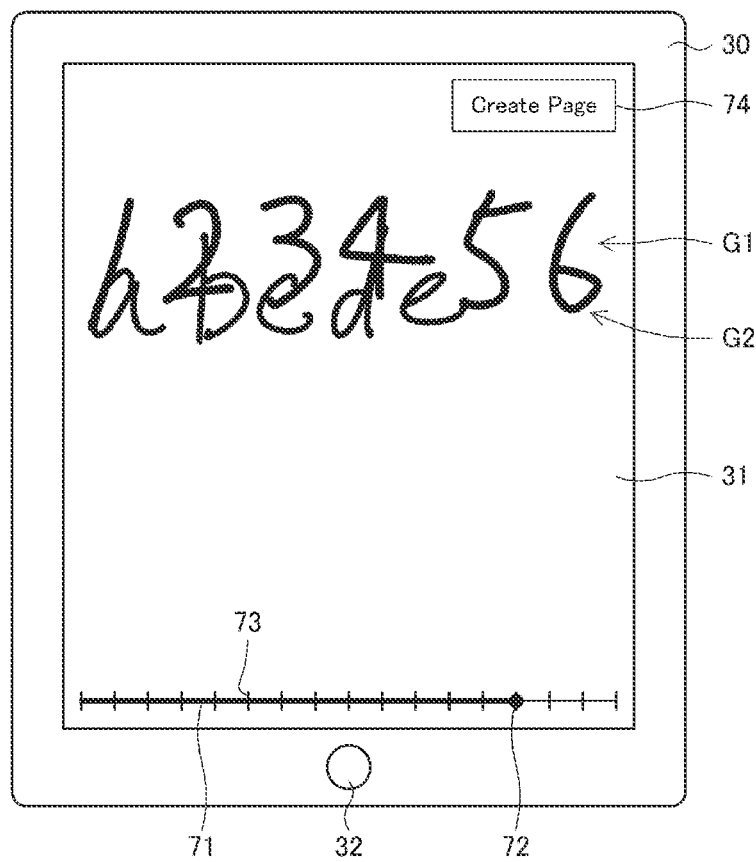
FIG. 9 is a diagram illustrating a display example of the touch screen 31 when the user moves a handle 72 by a slide operation at the sight of the display depicted in FIG. 8.
Figure 10:
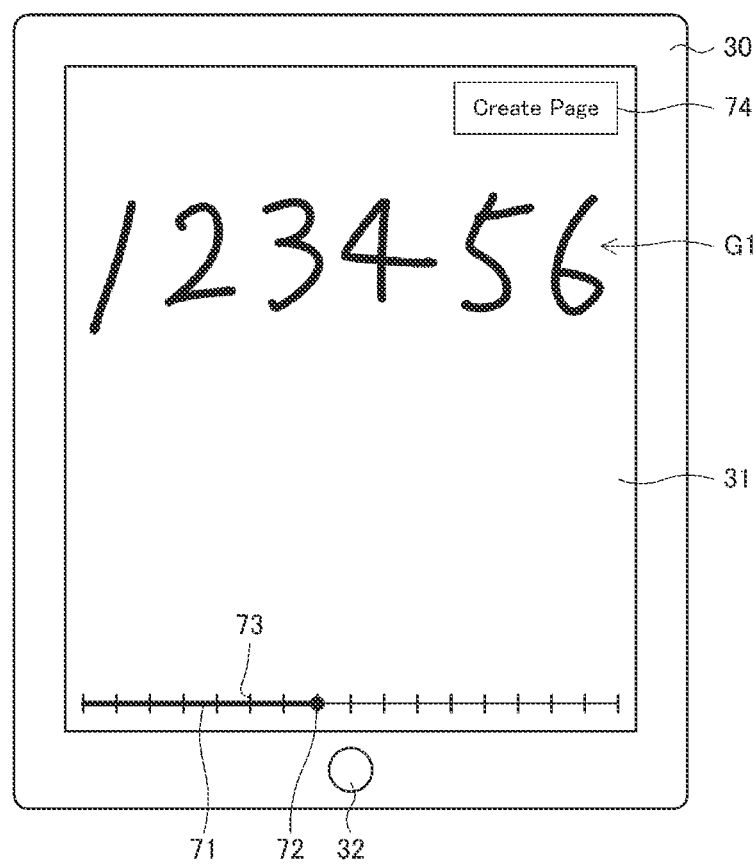
FIG. 10 is a diagram illustrating a display example of the touch screen 31 when the user moves the handle 72 by a slide operation at the sight of the display depicted in FIG. 8.

The slider 71 is originally a graphical user interface (GUI) that accepts an input value having a single value that falls within a certain range. In the present embodiment, the piece of stroke data having the most recent writing order of all the pieces of stroke data associated with a certain acquired page or the like is associated with the maximum value of the range of the slider 71, and the piece of stroke data having the least recent writing order is associated with the minimum value. In other words, the slider 71 is configured to start from the one written first of a series of stroke data acquired by the stroke data acquisition circuit 60 and ends at the one written last of the one or plurality of pieces of stroke data. Then, the input value of the slider 71 is used to change the break position between stroke data that is displayed and stroke data that is not displayed. That is, the slider 71 causes the user to input one of the values in the range having its maximum value associated with the most recent writing order of the writing orders of the series of stroke data and having its minimum value associated with the least recent writing order of the writing orders of the series of stroke data. Also, the slider 71 includes a handle 72 that is configured to move along the slider 71 by a user slide operation. The handle 72 is a GUI element for operating the slider 71 and is one element of the slider 71 that is also called control or knob. It should be noted that the handle 72 may not be in a special shape and may be an edge portion of a bar that is distinguished by a given color. As illustrated in FIGS. 9 and 10 which will be described later, the slider 71 may be highlighted starting from its starting point to the handle 72, for example, by bold type. The position of the handle 72 along the slider 71 indicates the break position, and the break position input acceptance circuit 62 is configured to accept break position input based on the position of the handle 72 along the slider 71.

The slider 71 is further configured to include one or more ticks 73 each of which is in one-to-one correspondence with one of a series of stroke data acquired by the stroke data acquisition circuit 60. In the example illustrated in FIG. 8, the stroke data groups G1 and G2 to be displayed have seventeen pieces of stroke data. Therefore, the slider 71 has the 17 ticks 73. Although the ticks 73 are suitably provided at equal intervals, timestamp information may be associated with each piece of stroke data in the file in the memory 35 so that the position of each of the ticks 73 along the slider 71 is determined based on the timestamp information. The interval between the ticks 73 varies depending on the number of pieces of stroke data to be displayed.

The handle 72 is suitably configured to move to the position equivalent to the tick 73 and configured not to stop at any other location along the slider 71. That is, the displacement of the handle 72 is suitably configured such that when the user moves the handle 72 by a slide operation, the handle 72 does not move smoothly and instead moves awkwardly as if to jump from one tick 73 to another and always moves to the position of each tick 73 corresponding to each piece of the stroke data. It should be noted, however, that the handle 72 may be naturally configured to move smoothly in response to a user slide operation.

FIGS. 9 and 10 illustrate display examples when the user moves the handle 72 by a slide operation at the sight of the display depicted in FIG. 8. In the example illustrated in FIG. 9, the user has moved the handle 72 to the fourth tick 73 from right. In this case, the stroke data equivalent to "e" corresponds to the break position. In the example illustrated in FIG. 10, on the other hand, the user has moved the handle 72 to the tenth tick 73 from right. In this case, the stroke data equivalent to "6" corresponds to the break position.

Referring back to FIG. 6, the continuous portion identification circuit 63 is configured to identify a continuous portion of a series of stroke data based on the break position acquired by the break position input acceptance circuit 62 and the writing order of the series of stroke data (writing order indicated by order information stored in the file) acquired by the stroke data acquisition circuit 60. More specifically speaking, the continuous portion identification circuit 63 identifies break position-corresponding stroke data that corresponds to a break position from among a series of stroke data and further identifies, based on the writing order, a first portion that includes the stroke data written least recently of the series of stroke data and break position-corresponding stroke data and a second portion other than the first portion, and treats the first portion as a continuous portion.

In the example illustrated in FIG. 9, fourteen pieces of stroke data corresponding to "123456abcde" are identified by the continuous portion identification circuit 63. Also, in the example illustrated in FIG. 10, eight pieces of stroke data corresponding to "123456" are identified by the continuous portion identification circuit 63.

The redisplay circuit 64 is configured to have a function to rewrite the display of the touch screen 31 by drawing the continuous portion identified by the continuous portion identification circuit 63 in the writing order. As a result, only one or more pieces of stroke data making up the continuous portion identified by the continuous portion identification circuit 63 are displayed on the touch screen 31, and other stroke data is no longer displayed as illustrated in FIGS. 9 and 10. Therefore, the user can confirm the currently identified stroke data with his or her own eyes.

After the redisplay by the redisplay circuit 64, the break position input acceptance circuit 62 leaves the slider 71 displayed as illustrated in FIGS. 9 and 10. Therefore, each time the user moves the handle 72, the processes by the break position input acceptance circuit 62, the continuous portion identification circuit 63, and the redisplay circuit 64 are repeated. As a result, the user can realize an appropriately identified state of stroke data (e.g., the state in which only the stroke data group G1 corresponding to "123456"

written on the first page as illustrated in FIG. 10 is identified in the examples illustrated in FIGS. 7 to 10).

Referring back to FIG. 6, the confirmation acceptance circuit 65, in operation, accepts break position confirmation operation. This confirmation operation is specifically a tap operation on the touch button 74 (refer to FIG. 10). The page or the like creation circuit 66 is configured to create a first page based on one or more pieces of stroke data being displayed on the touch screen 31 at that time and create a second page based on the remaining one or more pieces of stroke data of the series of stroke data that was initially displayed (series of stroke data acquired by the stroke data acquisition circuit 60) when break position confirmation operation is accepted by the confirmation acceptance circuit 65 and when the break position is a page break, and create a first section based on the one or more pieces of stroke data being displayed on the touch screen 31 at that time and create a second section based on the remaining one or more pieces of stroke data of the series of stroke data that was initially displayed (series of stroke data acquired by the stroke data acquisition circuit 60) when the break position is a section break. For example, when the user taps the touch button 74 in the example illustrated in FIG. 10, the page or the like creation circuit 66 creates a first page (or first section) including eight pieces of stroke data each corresponding to "123456" and a second page (or second section) including nine pieces of stroke data each corresponding to "abcdefg."

FIG. 4 illustrates another example in which a page is created by the page or the like creation circuit 66. In this example, a first page is created by stroke data up to the seventh piece of m pieces of stroke data included in a file #1, and a second page is created by stroke data from the eighth piece and beyond.

As illustrated in FIG. 4, each of the pages created by the page or the like creation circuit 66 is stored in the memory 35 as a file. More specifically, stroke data from the eighth piece and beyond is deleted from the file #1, and the file is saved as a new file #1 (first file). Stroke data from the eighth piece and beyond is stored in a file #1-1 (second file) that is created anew. In contrast, when the page or the like creation circuit 66 creates a section, a file includes a plurality of sections.

The page or the like creation circuit 66 is configured to associate each of the first and second pages or the like that have been created anew with order information indicating the creation order of the pages or the like. This order information is specifically timestamps. In the example illustrated in FIG. 4, timestamp information Tin that was associated with the file #1 before the process is associated with the file #1-1 that has been created anew, and time slightly earlier than the time indicated by the timestamp information Tin (denoted by Tin-a in FIG. 4) that was associated with the file #1 before the process is associated with the file #1 after the process. A "slightly earlier" time is an idea for indicating that the file #1 was created earlier than the file #1-1 and for ensuring that if there is a file (not depicted) that was created before the file #1, the time of creation of that file is not later than the time of creation of the file #1.

It should be noted that order information associated with each file may specifically not include the filename of each file or may be attached to each file as metadata. According to the former, it is easy for the user to visually recognize order information, and according to the latter, it is easy for computers to handle order information.

Figure 11:
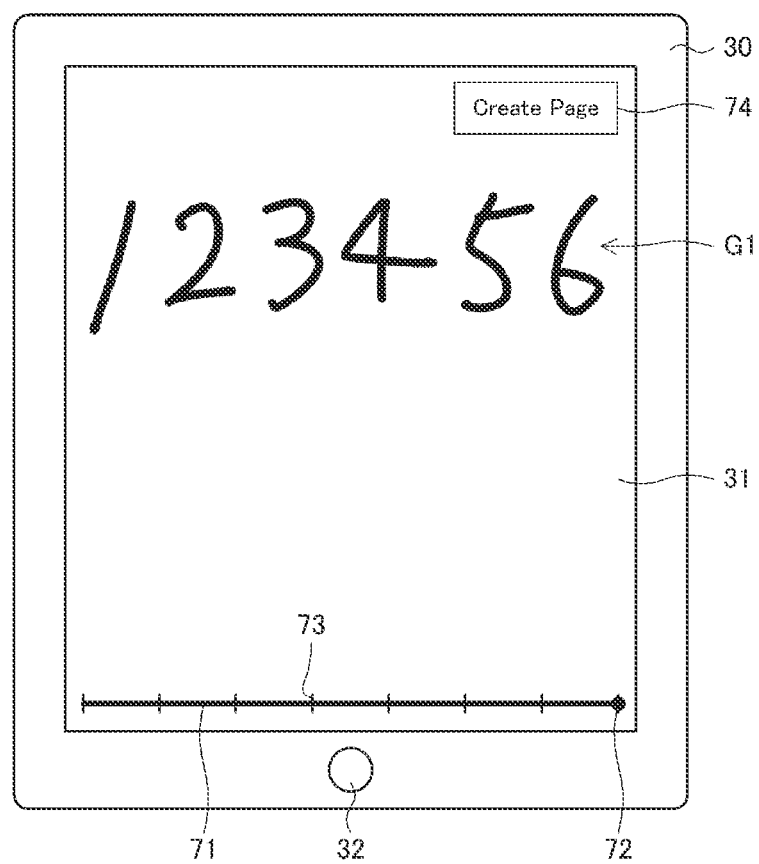
FIG. 11 is a diagram illustrating a display example of the touch screen 31 after the user taps a touch button 74 in FIG. 10.

After a new page or the like is created by the page or the like creation circuit 66, a series of stroke data is acquired again by the stroke data acquisition circuit 60. FIG. 11 illustrates a display example of the touch screen 31 after the user taps the touch button 74 in FIG. 10. This display example is obtained as a result of access made to the page or the like corresponding to "123456" and acquisition of eight pieces of stroke data included therein by the stroke data acquisition circuit 60. It should be noted that the touch button 70 (FIG. 7) is displayed by the display circuit 61 immediately after the acquisition of a series of stroke data by the stroke data acquisition circuit 60 as described above and that FIG. 11 illustrates the state after the user tapped this touch button 70. In FIG. 11, because the number of pieces of stroke data being displayed is eight, the number of ticks 73 displayed along the slider 71 is also eight. The process performed when the user slides the handle 72 or taps the touch button 74 in the screen displayed in this manner is the same as described above.

It should be noted that, for example, when the user taps near the right edge of the touch screen 31, the CPU 34 may cause the stroke data acquisition circuit 60 to acquire a series of stroke data included in the page or the like (hereinafter denoted as "A") associated with the creation time subsequent to the page or the like being displayed so as to switch the page or the like being displayed to "A" and when the user taps near the left edge of the touch screen 31, the CPU 34 may cause the stroke data acquisition circuit 60 to acquire a series of stroke data included in the page or the like (hereinafter denoted as "B") associated with the creation time previous to the page or the like being displayed so as to switch the page or the like being displayed to "B." This makes it possible for the user to confirm the details of an arbitrary page or the like on his or her own will.

As described above, the CPU 34 allows the user to input stroke data identification information and repetitively and selectively display and confirm only those pieces of stroke data which should correspond to a specific page of the series of stroke data that is displayed together at first in accordance with the input stroke data identification information. Then, a page or the like including only one or more pieces of selectively displayed stroke data and a page or the like including only other stroke data can be created. Also, the CPU 34 requires absolutely no barcode printed on a paper medium or IC chips embedded in a paper medium and needs no turn-over detection function. Therefore, it can be said that the handwritten data capture device 1 according to the present embodiment has realized, by a retroactive software-based means, the creation of page-by-page handwritten data (set of one or more pieces of stroke data) from handwriting written on each page of a general-purpose paper medium including a plurality of pages.

The processes performed by the CPU 34 will be described again in more detail with reference to the processing flow of the CPU 34.

Figure 12:
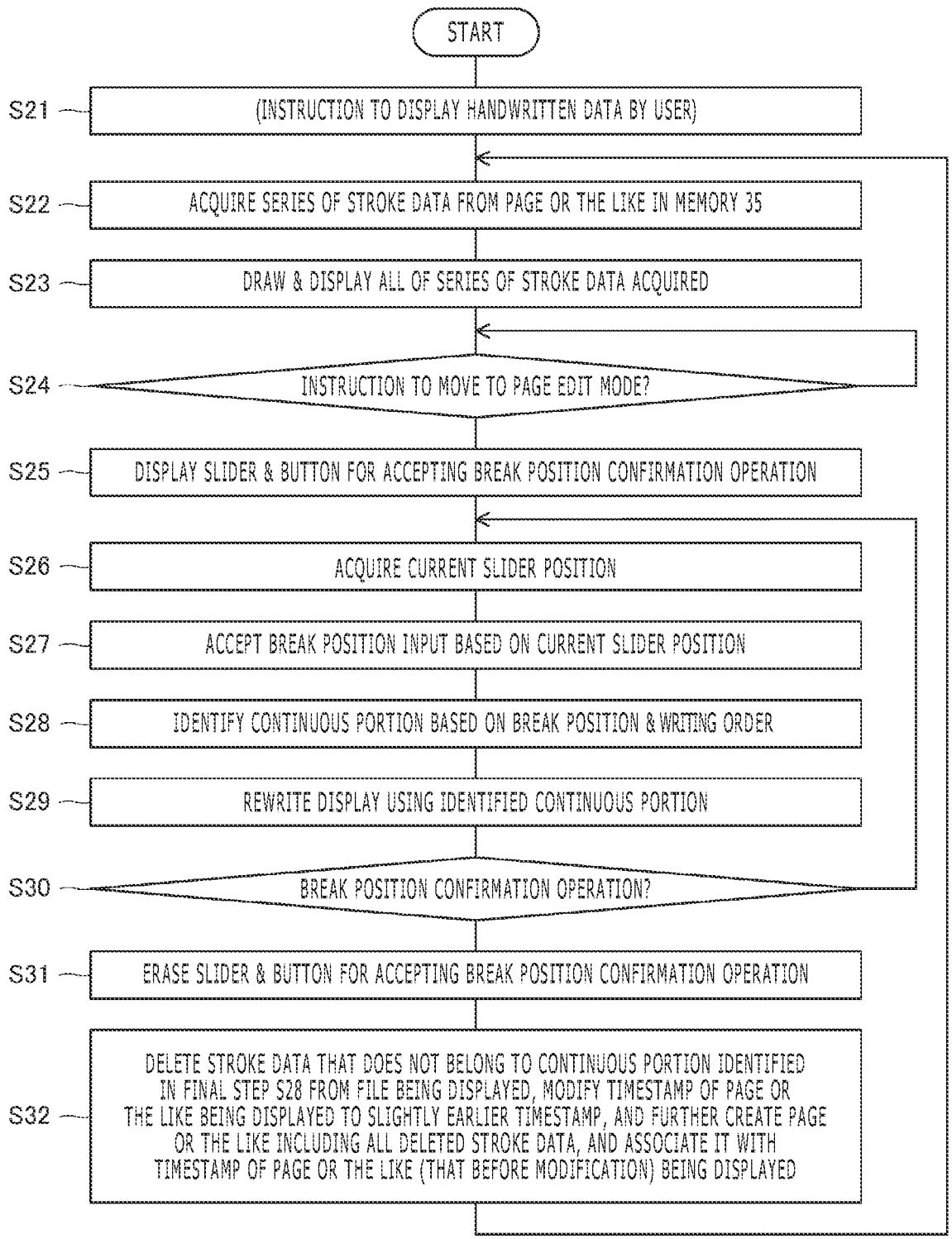
FIG. 12 is a diagram illustrating an example of a processing flow of the CPU 34 depicted in FIG. 2.

FIG. 12 is a diagram illustrating a processing flow of the CPU 34. As illustrated in the same figure, the CPU 34 acquires a series of stroke data from a certain page in the memory 35 (S22) in response to a user instruction to display handwritten data (S21). Pages or the like from which stroke data is acquired can be preferably specified by the user.

Next, the CPU 34 draws all the series of stroke data acquired and displays the data on the touch screen 31 (S23). Thereafter, the CPU 34 accepts a user instruction to switch to page edit mode (tapping of the touch button 70 illustrated in FIG. 7) (S24). Then, when the user instruction to switch to page edit mode is accepted, the CPU 34 displays a slider (slider 71, handle 72, and ticks 73 illustrated in FIG. 8) and an acceptance button for break position confirmation operation (touch button 74 illustrated in FIG. 8) (S25).

Thereafter, the CPU 34 repeats a series of processes (S30) consisting of acquiring the current slider position (S26), accepting a break position input based on the current position acquired (S27), identifying the continuous portion of the series of stroke data based on the input break position and writing order (S28), and rewriting the display of the touch screen 31 using the identified continuous portion (S29) until the user performs break position confirmation operation. Then, when break position confirmation operation is performed, the CPU 34 erases the slider and the acceptance button for break position confirmation operation (S31), deletes stroke data that does not belong to the continuous portion identified in S28 that was performed last from the page or the like being displayed and modifies the timestamp of the page or the like to a timestamp at a slightly earlier time, and further creates a page or the like anew that includes all the stroke data deleted and associates that page or the like with the timestamp of the page or the like being displayed (timestamp before the modification) (S32). As a result, the page or the like being displayed is divided between the break position (stroke data) identified by the current slider position acquired last at S26 and the stroke data subsequent thereto. Thereafter, the processes from S22 and beyond are repeated.

As described above, the handwritten data capture device 1 according to the present embodiment allows the LED lamp 5b to flash light green slowly at a time considered a page break, making it possible to prevent one from forgetting to press the operating button 4 for changing the storage destination file of handwritten data.

Also, the handwritten data capture device 1 according to the present embodiment allows the user to display only those pieces of stroke data which correspond to a specific page of the series of stroke data that is displayed together at first by inputting stroke data identification information. That is, it is possible to identify one or more pieces of stroke data corresponding to a specific page by a software-based means. Therefore, the handwritten data capture device 1 according to the present embodiment further allows for proper classification of handwritten data page by page after the acquisition of handwriting written on each page of a general-purpose paper medium including a plurality of pages.

Although preferred embodiments of the present disclosure have been described above, the present disclosure is in no way limited by these embodiments, and it is a matter of course that the present disclosure can be carried out in various forms without departing from the gist of the present disclosure.

Figure 13:
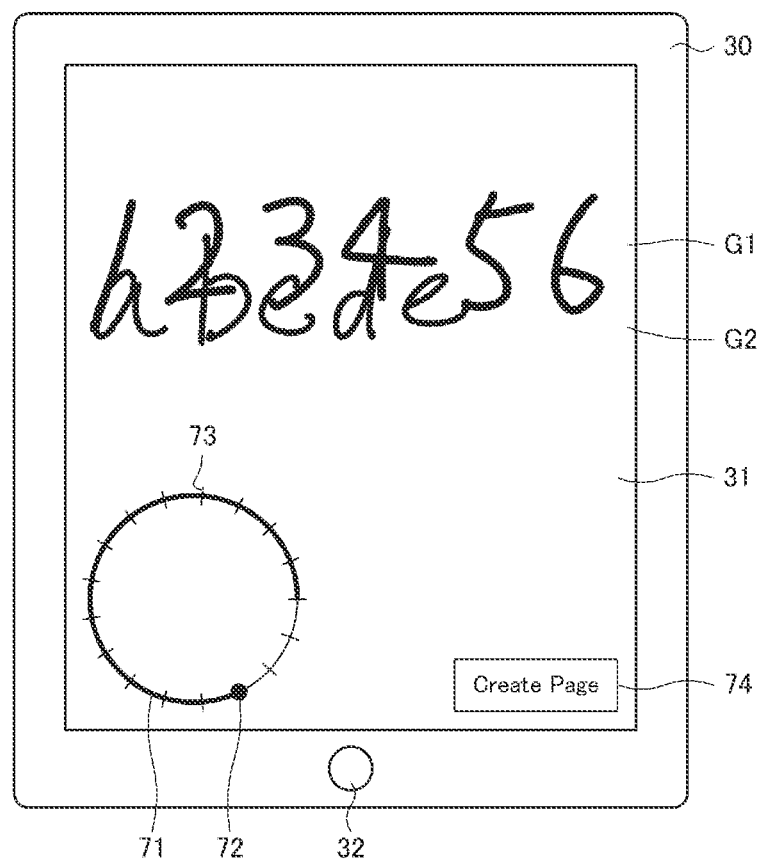
FIG. 13 is a diagram illustrating a modification example of a slider 71 according to an embodiment of the present disclosure.

For example, although an example was described in the above embodiment in which a linear slider 71 (FIG. 8) was used as a first user interface for causing the user to specify a page break, a slider formed, for example, in a curved shape such as the circular slider 71 illustrated in FIG. 13 may be used. Also, although an example was depicted in the above embodiment in which the touch button 74 was displayed at the top right corner of the touch screen 31 as a second user interface for causing the user to perform page break confirmation operation, the arrangement of the second user interface is not limited to the top right corner of the touch screen 31 as the touch button 74 illustrated in FIG. 13, for example.

Moreover, the handle 72 of the slider 71 can be used as a second user interface rather than the touch button 74. In this case, the confirmation acceptance circuit 65 suitably accepts break position confirmation operation as the user continues to tap (continues to press and hold) the handle 72 for a given time period.

Also, although each of the ticks 73 displayed along the slider 71 was configured to be in one-to-one correspondence with one of a series of stroke data acquired by the stroke data acquisition circuit 60, the ticks 73 can be configured to be in multi-to-one correspondence with one of the series of stroke data. This makes it possible for the user to distinguish one tick 73 from another even if the number of pieces of stroke data making up the series of stroke data is extremely large.

In this case, the scale of the slider 71 can be preferably increased by the user pressing and holding the handle 72 or the slider 71 for a given time period or more. That is, assuming that the tick 73 displayed initially when the stroke data acquisition circuit 60 acquires a series of stroke data is a first tick, and when the handle 72 or the slider 71 is pressed and held for a given time period or more by the user, one or more first ticks are preferably replaced by one or more second ticks each of which is in multi-to-one or one-to-one correspondence with one of a group of stroke data having smaller number of pieces than the group of the stroke data, the group of stroke data corresponding to the pressed position and its nearby area. This makes it possible for the user to insert finely spaced break positions on a stroke-data-by-stroke-data basis even if the number of pieces of stroke data making up the series of stroke data is extremely large.

Figure 14:
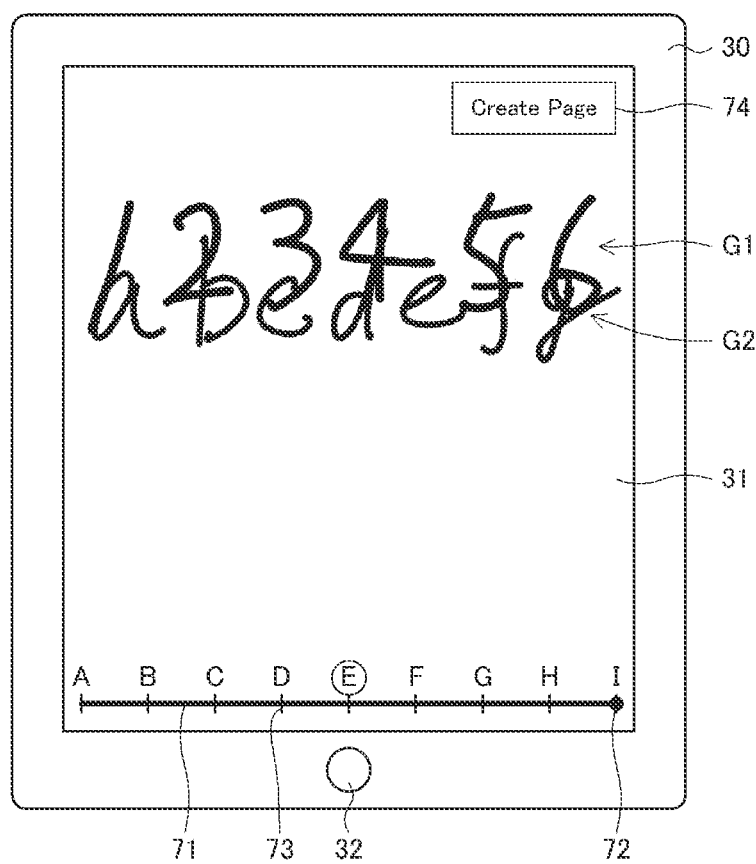
FIG. 14 is a diagram illustrating another modification example of the slider 71 according to an embodiment of the present disclosure.

A specific description will be given of the following respects with reference to FIGS. 14 and 15. FIG. 14 illustrates a state in which the same stroke data as in FIG. 8 is displayed on the touch screen 31. However, because two pieces of stroke data are assigned to the single tick 73, the number of ticks 73 is half that in the example illustrated in FIG. 8 (it should be noted that because the number of pieces of stroke data is odd or 17, the number of ticks 73 is, to be precise, half that in FIG. 8 plus 1). Describing specific assignments, "1" and "2" are assigned to a tick A illustrated, "3" and the first stroke of "4" are assigned to a tick B, the second stroke of "4" and the first stroke of "5" are assigned to a tick C, the second stroke of "5" and "6" are assigned to a tick D, "a" and the first stroke of "b" are assigned to a tick E, the second stroke of "b" and "c" are assigned to a tick F, "d" and "e" are assigned to a tick G, the first and second strokes of "f" are assigned to a tick H, and "g" is assigned to a tick I. In this case, when the user presses, for example, an area near circled "E" illustrated in FIG. 14 long, the number of pieces of stroke data assigned to one tick 73 is reduced, for example, to 1. In the example illustrated in FIG. 14, for example, the second stroke of "4" is assigned to the tick A, the first stroke of "5" is assigned to the tick B, the second stroke of "5" is assigned to the tick C, "6" is assigned to the tick D, "a" is assigned to the tick E, the first stroke of "b" is assigned to the tick F, the second stroke of "b" is assigned to the tick G, "c" is assigned to the tick H, and "d" is assigned to the tick I. This makes it possible for the user to specify a break position only within the range from the second stroke of "4" to "d" but specify finely spaced break positions on a stroke-data-by-stroke-data basis.

Figure 15:
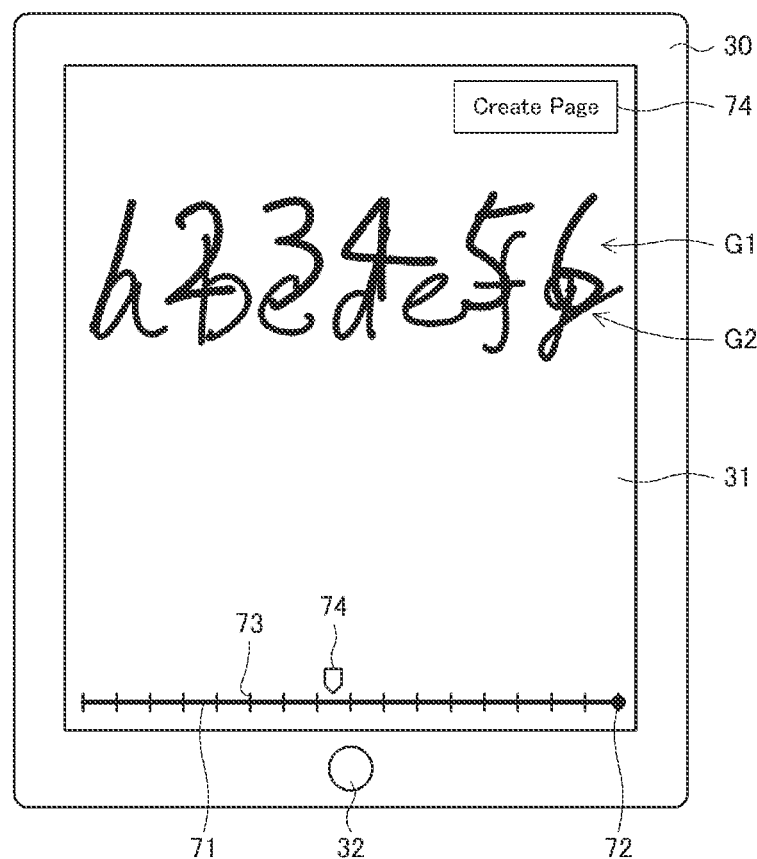
FIG. 15 is a diagram illustrating still another modification example of the slider 71 according to an embodiment of the present disclosure.

Also, the pointer 74 illustrated in FIG. 15 may be provided along the slider 71 in addition to the handle 72 and the memory 73. This pointer 74 is displayed near the slider 71 to present the user with a candidate position that serves as a candidate for break position. Candidate positions are derived by the break position input acceptance circuit 62.

There are two possible ways for the break position input acceptance circuit 62 to derive a candidate position. The first one can be used when a timestamp indicating a writing time is attached to each of a series of stroke data included in a page or the like, and a candidate position is derived based on the difference between times indicated by timestamps of two pieces of stroke data that are adjacent in writing order. With this method, it is possible to calculate, as a candidate position, a position where the user is highly likely to have changed pages because of a time difference that is large to a certain extent or more such as more-than-one-day-old timestamp.

The second one derives a candidate position based on the displacement of one of first and second directions (vertical and horizontal directions of the rectangular writing surface) that are orthogonal to each other on the writing surface between two pieces of stroke data that are adjacent in writing order. With this method, it is possible to calculate, as a candidate position, a line start position and so on that should mark the position or section where the user is highly likely to have changed pages such as handwriting jumping from bottom to top of a page and a line start position in horizontal writing.

Figure 16:
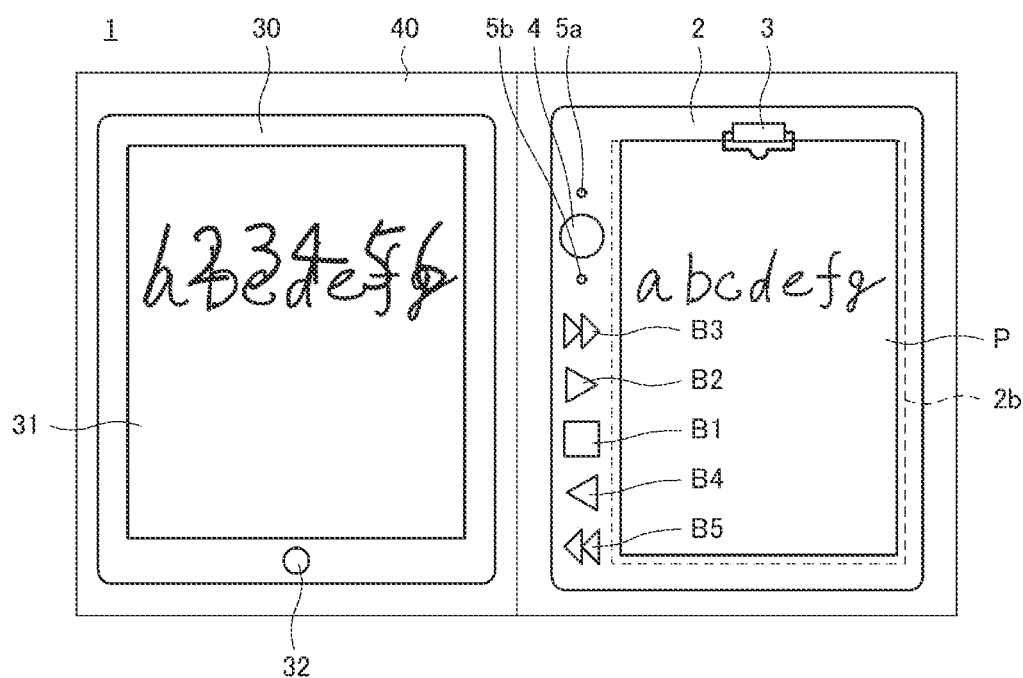
FIG. 16 is a diagram illustrating a modification example of first and second user interfaces according to an embodiment of the present disclosure.

Also, the first and second user interfaces can be realized by hardware buttons. FIG. 16 illustrates such first and second user interfaces. The handwritten data capture device 1 illustrated in the same figure has, at one end of the digitizer 2, a stop/confirm button B1 with a rectangle, a forward button B2 with a triangle to the right, a fast forward button B3 with two triangles pointing to the right, a back button B4 with a triangle pointing to the left, and a rewind button B5 with two triangles pointing to the left. All these buttons make up the first user interface, and the button B1 also serves as the second user interface. It should be noted that the pressed state of each of the buttons B1 to B5 is successively notified from the digitizer 2 to the computer 30.

When the user presses the back button B4 once, the break position input acceptance circuit 62 acquires stroke data identification information that identifies the stroke data that is previous in writing order to the stroke data identified by the stroke data identification information that was acquired last. On the other hand, when the user presses the forward button B2 once, the break position input acceptance circuit 62 acquires stroke data identification information that identifies the stroke data that is subsequent in writing order to the stroke data identified by the stroke data identification information that was acquired last. The fast forward button B3 and the rewind button B5 are buttons that automatically produce the same effects as when the forward button B2 and the back button B4 are pressed in succession (fast forward and rewind), respectively. Fast forwarding and rewinding stop when the stop/confirm button B1 is pressed while fast forwarding or rewinding stop is in progress. When the user presses the stop/confirm button B1 while fast forwarding and rewinding are not in progress, page break confirmation operation is accepted by the confirmation acceptance circuit 65. As each of the buttons B1 to B5 plays the role as described above, the handwritten data capture device 1 illustrated in FIG. 16 can create page-by-page handwritten data as does the handwritten data capture device 1 described in the above embodiment.

Also, although, in the above embodiment, the continuous portion identification circuit 63 identified a first portion including break position-corresponding stroke data as a continuous portion, a second portion not including break position-corresponding stroke data may be identified as a continuous portion. Also, although stroke data written least recently was included in a first portion, stroke data written most recently may be included in a first portion.

Also, although, in the above embodiment, the LED lamp 5a was amber and the LED lamp 5b was green or light green, this is illustrative, and the actual colors of the LED lamps 5a and 5b are arbitrary. The colors of the LED lamps 5a and 5b are preferably determined as appropriate in consideration of ergonomics to ensure that proper impacts are made on the user. The same is true for the lighting states and the flashing method of the LED lamps 5a and 5b. Further, similar notification may be made by sound, vibration, and so on in place of or together with the LED lamps 5a and 5b in consideration of visually handicapped users.

Also, although, in the above embodiment, LED lamps were used as a notification means having a user notification function, "sound" or "flashing icons on the tablet screen" can be used as a notification means in place of or together with LED lamps.

Also, although, in the above embodiment, an example was described in which an EMR-based position detection device was used, the present disclosure is also suitably applicable to a type of position detection device that sends signals to a position detector from a pointing body based, for example, on AES (Active Electrostatic) method having a battery.

What is claimed is:

1. A display control method, comprising:
generating third stroke data based on a plurality of positions indicated by a position indicator, the third stroke data including first stroke data and second stroke data;
controlling a display device to display in a first display state, wherein the first stroke data and the second stroke data included in the third stroke data are displayed in the first display state;
controlling the display device to display a user interface including a plurality of user interface elements that respectively correspond to a plurality of pieces of stroke data included in the third stroke data;
receiving an input corresponding to one of the user interface elements of the user interface;
after the controlling the display device to display in the first display state, controlling the display device to display in a second display state based on the input corresponding to the one of the user interface elements of the user interface, wherein the first stroke data are displayed and the second stroke data are not displayed in the second display state;
storing the third stroke data in a first file; and
based on a predetermined operation, storing the first stroke data and the second stroke data in two separate files, respectively.

2. The display control method of claim 1, further comprising:
based on the predetermined operation, deleting the second stroke data from the first file, and storing the second stroke data in a second file different from the first file.

3. The display control method of claim 1,
wherein the user interface includes a slider, wherein the slider includes a handle,
wherein the controlling the display device to display in the second display state is based on a position of the handle on the slider.

4. The display control method of claim 3, wherein:
the slider includes one or more ticks, and
a number of the one or more ticks included on the slider is equal to a number of the pieces of stroke data included in the third stroke data.

5. The display control method of claim 4, wherein the handle is moveable to one or more positions on the slider corresponding to the one or more ticks and is not moveable to positions on the slider other than the one or more positions on the slider corresponding to the one or more ticks.

6. The display control method of claim 3, comprising:
based on a predetermined operation, controlling the display device to display the slider,
wherein the slider includes one or more ticks, and
a number of the one or more ticks included on the slider is equal to a number of the pieces of stroke data included in the first stroke data.

7. An apparatus, comprising:
a processor; and
a memory storing instructions that, when executed by the processor, cause the apparatus to:
generate third stroke data based on a plurality of positions indicated by a position indicator, the third stroke data including first stroke data and second stroke data;
control a display device to display in a first display state, wherein the first stroke data and the second stroke data included in the third stroke data are displayed in the first display state;
control the display device to display a user interface including a plurality of user interface elements that respectively correspond to a plurality of pieces of stroke data included in the third stroke data;
receive an input corresponding to one of the user interface elements of the user interface;
after controlling the display device to display in the first display state is displayed on the display based on the input corresponding to the one of the user interface elements of the user interface, control the display device to display in a second display state, wherein the first stroke data are displayed and the second stroke data are not displayed in the second display state;
store the third stroke data in a first file; and
based on a predetermined operation, store the first stroke data and the second stroke data in two separate files, respectively.

8. The apparatus of claim 7, wherein the instructions, when executed by the processor, cause the apparatus to, based on the predetermined operation, delete the second stroke data from the first file and store the second stroke data in a second file different from the first file.

9. The apparatus of claim 7, wherein:
the user interface includes a slider having a handle, and
the display device is controlled to display in the second display state based on a position of the handle on the slider.

10. The apparatus of claim 9, wherein:
the slider includes one or more ticks, and
a number of the one or more ticks included on the slider is equal to a number of the pieces of stroke data included in the third stroke data.

11. The apparatus of claim 10, wherein the handle is moveable to one or more positions on the slider corresponding to the one or more ticks and is not moveable to positions on the slider other than the one or more positions on the slider corresponding to the one or more ticks.

12. The apparatus of claim 9, wherein:
the instructions, when executed by the processor, cause the apparatus to, based on a predetermined operation, control the display device to display the slider,
the slider includes one or more ticks, and
a number of the one or more ticks included on the slider is equal to a number of the pieces of stroke data included in the first stroke data.

13. A non-transitory computer readable medium storing instructions that, when executed by a processor of a computer, cause the computer to:
generate third stroke data based on a plurality of positions indicated by a position indicator, the third stroke data including first stroke data and second stroke data;
control a display device to display in a first display state, wherein the first stroke data and the second stroke data included in the third stroke data are displayed in the first display state;
control the display device to display a user interface including a plurality of user interface elements that respectively correspond to a plurality of pieces of stroke data included in the third stroke data;
receive an input corresponding to one of the user interface elements of the user interface;
after controlling the display device to display in the first display state, control the display device to display in a second display state based on the input corresponding to the one of the user interface elements of the user interface wherein the first stroke data are displayed and the second stroke data are not displayed in the second display state;
store the third stroke data in a first file; and
based on a predetermined operation, store the first stroke data and the second stroke data in two separate files, respectively.

14. The non-transitory computer readable medium of claim 13, wherein the instructions, when executed by the processor, cause the computer to, based on the predetermined operation, delete the second stroke data from the first file and store the second stroke data in a second file different from the first file.

15. The non-transitory computer readable medium of claim 13, wherein:
wherein the user interface includes a slider having a handle, and
the display device is controlled to display in the second display state based on a position of the handle on the slider.

16. The non-transitory computer readable medium of claim 15, wherein:
the slider includes one or more ticks, and
a number of the one or more ticks included on the slider is equal to a number of the pieces of stroke data included in the third stroke data.

17. The non-transitory computer readable medium of claim 16, wherein the handle is moveable to one or more positions on the slider corresponding to the one or more ticks and is not moveable to positions on the slider other than the one or more positions on the slider corresponding to the one or more ticks.

18. The non-transitory computer readable medium of claim 15, wherein:
the instructions, when executed by the processor, cause the computer to, based on a predetermined operation, control the display device to display the slider,
the slider includes one or more ticks, and
a number of the one or more ticks included on the slider is equal to a number of the pieces of stroke data included in the first stroke data.

* * * * *